United States Patent
Sant et al.

(10) Patent No.: US 11,413,578 B2
(45) Date of Patent: Aug. 16, 2022

(54) ALKALINE CATION ENRICHMENT AND WATER ELECTROLYSIS TO PROVIDE $CO_2$ MINERALIZATION AND GLOBAL-SCALE CARBON MANAGEMENT

(71) Applicant: The Regents of the University of California, Oakland, CA (US)

(72) Inventors: Gaurav Sant, Los Angeles, CA (US); Erika Callagon La Plante, Los Angeles, CA (US); Jingbo Wang, Los Angeles, CA (US); David Jassby, Los Angeles, CA (US); Dante Simonetti, Los Angeles, CA (US); Abdulaziz Alturki, Los Angeles, CA (US); Xin Chen, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/408,236

(22) Filed: Aug. 20, 2021

(65) Prior Publication Data
US 2022/0040639 A1 Feb. 10, 2022

Related U.S. Application Data

(63) Continuation of application No. PCT/US2020/037629, filed on Jun. 12, 2020.
(Continued)

(51) Int. Cl.
*C02F 1/461* (2006.01)
*C01B 32/60* (2017.01)
(Continued)

(52) U.S. Cl.
CPC ........... *B01D 53/965* (2013.01); *B01D 53/62* (2013.01); *B01D 53/78* (2013.01); *C01B 13/36* (2013.01);
(Continued)

(58) Field of Classification Search
CPC .... B01D 53/62; B01D 53/78; B01D 2251/30; B01D 2251/40; B01D 2251/604;
(Continued)

(56) References Cited

U.S. PATENT DOCUMENTS 3,655,537 A * 4/1972 Russell .................. B01D 53/62
205/349
2004/0253417 A1* 12/2004 Sekoguchi ............... B03C 3/41
428/195.1
(Continued)

FOREIGN PATENT DOCUMENTS

CN 107268027 A 10/2017
DE 43 26 757 A1 2/1994

OTHER PUBLICATIONS

International Search Report and Written Opinion dated Mar. 25, 2021, from application No. PCT/US2020/037629, 10 pages.
(Continued)

*Primary Examiner* — Timothy C Vanoy
(74) *Attorney, Agent, or Firm* — Foley Hoag LLP; David P. Halstead; Hilary Dorr Lang

(57) ABSTRACT

Provided herein are methods of removing carbon dioxide from an aqueous stream or gaseous stream by: contacting the gaseous stream comprising carbon dioxide, when present, with an aqueous solution comprising ions capable of forming an insoluble carbonate salt; contacting the aqueous solution comprising carbon dioxide with an electroactive mesh that induces its alkalinization thereby forcing the precipitation of a carbonate solid from the solution and thereby the removal of dissolved inorganic carbon by electrolysis; and removing the precipitated carbonate solids from the solution, or the surface of the mesh where they may deposit. Also provided herein are flow-through electrolytic reactors comprising an intake device in fluid connection with a rotating cylinder comprising an electroactive mesh,
(Continued)

and a scraping device and/or liquid-spray based device for separating a solid from the mesh surface.

29 Claims, 11 Drawing Sheets
(3 of 11 Drawing Sheet(s) Filed in Color)

Related U.S. Application Data

(60) Provisional application No. 62/861,848, filed on Jun. 14, 2019.

(51) Int. Cl.

| | | |
|---|---|---|
| *C01B 13/36* | (2006.01) | |
| *B01D 53/96* | (2006.01) | |
| *B01D 53/78* | (2006.01) | |
| *B01D 53/62* | (2006.01) | |
| *C02F 103/08* | (2006.01) | |
| *C02F 103/18* | (2006.01) | |

(52) U.S. Cl.
CPC ............ *C01B 32/60* (2017.08); *C02F 1/4618* (2013.01); *C02F 1/46109* (2013.01); *B01D 2251/402* (2013.01); *B01D 2251/404* (2013.01); *B01D 2252/1035* (2013.01); *B01D 2257/504* (2013.01); *B01D 2258/025* (2013.01); *B01D 2258/0233* (2013.01); *B01D 2258/0283* (2013.01); *B01D 2258/06* (2013.01); *C02F 2001/4619* (2013.01); *C02F 2001/46133* (2013.01); *C02F 2001/46161* (2013.01); *C02F 2001/46171* (2013.01); *C02F 2103/08* (2013.01); *C02F 2103/18* (2013.01); *C02F 2201/4618* (2013.01)

(58) Field of Classification Search
CPC ........ B01D 2251/606; B01D 2257/504; B01D 2258/06; B01J 10/00; B01J 19/087; B01J 2219/0805; B01J 2219/0807; A61L 9/00; A61L 9/16; A61L 9/22; Y02C 20/40
See application file for complete search history.

(56) References Cited

U.S. PATENT DOCUMENTS

| | | | |
|---|---|---|---|
| 2010/0150803 A1* | 6/2010 | Lin | B01D 53/62 423/224 |
| 2010/0260653 A1* | 10/2010 | Jones | B01D 53/62 423/225 |
| 2017/0191173 A1 | 7/2017 | Han et al. | |
| 2020/0122090 A1* | 4/2020 | Kitaura | B01D 53/228 |
| 2021/0123146 A1* | 4/2021 | Berlinguette | C25B 9/23 |
| 2021/0308623 A1* | 10/2021 | Sorimachi | B01D 53/965 |

OTHER PUBLICATIONS

Jun-Hwan Bang, et al., "CO2 Mineralization Using Brine Discharged from a Seawater Desalination Plant", Abstract, Minerals, vol. 7, No. 207, Oct. 30, 2017, pp. 1-12.

* cited by examiner

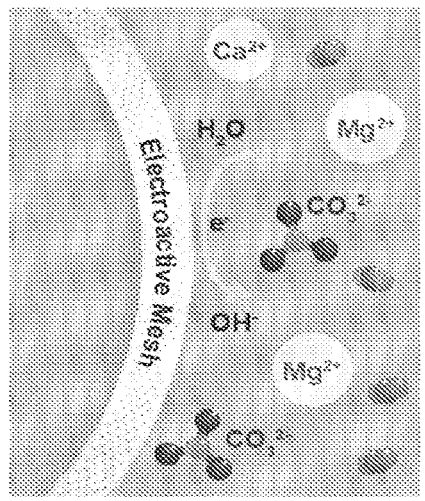
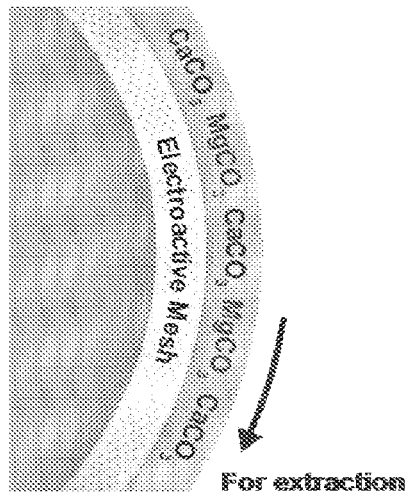
FIG. 6(a)
FIG. 6(b)
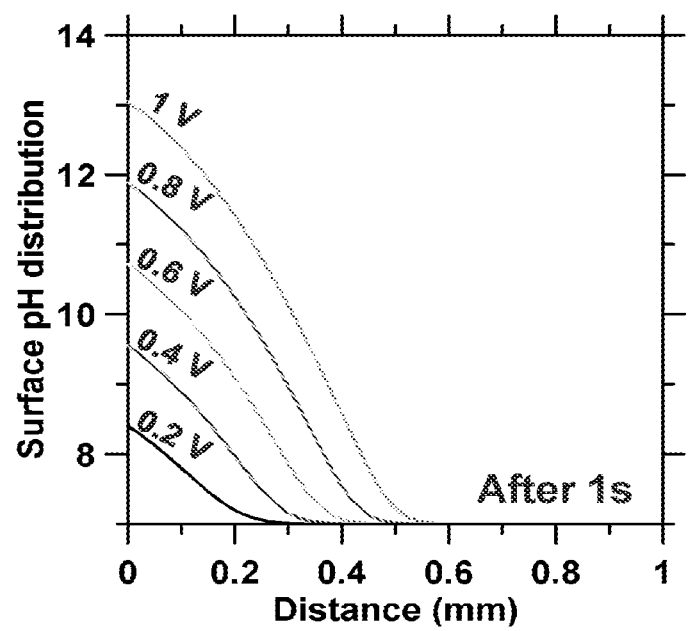
FIG. 6(c)

ALKALINE CATION ENRICHMENT AND WATER ELECTROLYSIS TO PROVIDE $CO_2$ MINERALIZATION AND GLOBAL-SCALE CARBON MANAGEMENT

CROSS-REFERENCE TO RELATED APPLICATIONS

This application claims the benefit of PCT International Application No. PCT/US2020/037629, filed Jun. 12, 2020, which claims priority to U.S. Provisional Patent Application No. 62/861,848, filed Jun. 14, 2019, which is incorporated by reference herein in its entirety.

STATEMENT REGARDING FEDERALLY SPONSORED RESEARCH OR DEVELOPMENT

This invention was made with government support under Grant Numbers DE-FE-0029825 and DE-FE0031718, awarded by the Department of Energy. The government has certain rights in the invention.

BACKGROUND

The management of existing atmospheric carbon dioxide and ongoing carbon dioxide emissions is desired to mitigate against the increase in the global average temperature and to reduce the effects of climate change. To realistically achieve this, about 10-20 gigatons (Gt) of $CO_2$ per year have to be removed from the atmosphere within the next century, demanding carbon management strategies that can be implemented at a large scale.

Comparative carbon capture and storage is conditioned around handling $CO_2$ in a fluid state (e.g., gas, liquid, or supercritical). Such fluid-state handling imposes constraints and complexities around pathways, processes, and disposal routes for $CO_2$, including expensive and energy intensive separation, large energy demands for compression, and high cost for pressurized containment which has the potential for leakage.

The injection of $CO_2$ captured from point sources, or the atmosphere into geological formations including: (depleted) oil and gas reservoirs, unmineable coal beds, and saline aquifers could sequester up to 22,000 Gt of $CO_2$ in North America. While the theoretical capacity is enormous, practically, pressure limitations, needed to prevent rock fracturing or the reactivation of existing faults, and/or the presence of residual hydrocarbons result in a more modest storage capacity around 700 Mt per year over 50 years of injection. Although the conceivable capacity of geological sequestration sites is anticipated to be more than sufficient to accommodate current (and future) levels of $CO_2$ emissions, the risk of $CO_2$ migration and leakage, and the management and verification of the injection process necessitate significant monitoring of the wells, the subsurface, and the ground surface over time. In addition, traditional approaches for carbon management based on carbon capture, sequestration, and storage (CCSS) are hostage to: (i) the thermodynamic penalties associated with the entropy of demixing $CO_2$ from either air or a flue gas stream and the subsequent need to fulfill the enthalpy of desorbing $CO_2$ from a solid- or liquid substrate, and (ii) the need for tremendous logistics and conveyance infrastructure (e.g., pipelines) to transport $CO_2$ to geological sequestration sites. Particularly, in conventional sorption/desorption-based $CO_2$ capture, energy expenditure is associated with the separation of $CO_2$ from a gaseous mixture, involving a decrease in the system's entropy, and the desorption step which allows the concentration of $CO_2$ to a grade sufficient for pipeline transport, and subsequent geological sequestration. Taken together, while technical challenges remain, and are progressively being resolved—practical realization of CCSS is strongly conditioned on supportive policy that empowers, de-risks, and pending best-practices and time-bound monitoring, in the limit, holds-harmless developers of CCSS projects, around the world.

Beyond geological sequestration and storage, changes in land use, agricultural practices, marine geoengineering, and the chemical conversion of $CO_2$ to building materials offer alternate large-scale pathways that make-up the portfolio of approaches for ensuring carbon management (e.g., emissions reduction, and atmospheric carbon removal). While some progress has been made in the development of negative ($CO_2$/carbon) emissions technologies (NETs), much more substantive "exponential" advancements are needed to achieve the necessary rates of $CO_2$ removal, and durable carbon storage in a cost-effective/-viable manner.

It is against this background that a need arose to develop the embodiments described in this disclosure.

SUMMARY

Some embodiments of the disclosure include methods of removing carbon dioxide from an aqueous stream or gaseous stream by: contacting the gaseous stream comprising carbon dioxide, when present, with an aqueous solution comprising ions capable of forming an insoluble carbonate salt; contacting the aqueous solution comprising carbon dioxide with an electroactive mesh that induces its alkalinization thereby forcing the precipitation of a carbonate solid(s) from the solution; and removing the precipitated carbonate solids from the solution, or the surface of the mesh where they may deposit. In some embodiments, the gaseous stream is present. In some embodiments, the gaseous stream comprises between 0.04 to 100 vol. % $CO_2$. In some embodiments, the gaseous fluid is atmospheric air. In some embodiments, the gaseous fluid is flue gas emitted from a natural gas-fired power plant, a coal-fired power plant, an iron mill, a steel mill, a cement plant, an ethanol plant, and a chemical manufacturing plant. In some embodiments, the aqueous solution contains an amount of dissolved carbon dioxide that is in equilibrium with the gaseous stream. In some embodiments, the aqueous solution is in thermal equilibrium with the gaseous stream. In some embodiments, the aqueous solution is not in thermal equilibrium with the gaseous stream. In some embodiments, the gaseous stream is not present. In some embodiments, the ions capable of forming an insoluble carbonate salt comprise ions including one or more of the following Ca, Mg, Ba, Sr, Fe, Zn, Pb, Cd, Mn, Ni, Co, Cu, and Al. In some embodiments, the aqueous solution has a concentration of NaCl of about 1,000 ppm or more. In some embodiments, the aqueous solution has a concentration of NaCl of about 30,000 ppm or more. In some embodiments, the aqueous solution comprises seawater. In some embodiments, the electroactive mesh comprises a mesh cathode that comprises a metallic or a non-metallic composition. In some embodiments, the method utilizes an end-to-end energy intensity of about 2.5 MWh or less per ton of carbon dioxide mineralized. In some embodiments, the aqueous solution contains an amount of dissolved carbon dioxide that is buffered to atmospheric abundance. In some embodiments, the electroactive mesh produces an increased alkaline condition, in situ, in the aqueous solution within about 2 to 20000 μm of the electroactive mesh. In some embodiments, the alkalinized condition is a pH of 9 or greater. In some embodiments, the electroactive mesh consists of a metallic or carbon-based mesh. In some embodiments, the electroactive mesh contains stainless steel, titanium oxide, carbon nanotubes, polymers, and/or graphite, or other hybrid compositions of these materials. In some embodiments, the electroactive mesh comprises pores having a diameter in the range of about 0.1 μm to about 10000 μm. In some embodiments, inducing the precipitation of the carbonate solid includes rotating a cylinder consisting of the electroactive mesh in the solution, while applying suction to draw the solution onto the outer surface of the mesh. In some embodiments, the solution is a brine solution. In some embodiments, the solution is an alkaline metal-containing solution. In some embodiments, inducing precipitation of the carbonate solid includes inducing precipitation of at least one carbonate having Ca, Mg, Ba, Sr, Fe, Zn, Pb, Cd, Mn, Ni, Co, Cu, or Al.

Some embodiments of the disclosure include flow-through electrolytic reactors comprising an intake device in fluid connection with a rotating cylinder comprising an electroactive mesh, and a scraping device and/or liquid-spray based device for separating a solid from a surface or solution. In some embodiments, the reactors further comprise an aqueous solution comprising carbon dioxide, Ca ions, and Mg ions. In some embodiments, the electroactive mesh is capable of inducing removal of dissolved inorganic carbon by precipitation of a carbonate solid from an aqueous solution comprising carbon dioxide and ions capable of forming an insoluble carbonate salt. In some embodiments, the electroactive mesh contains a metallic or carbon-based mesh. In some embodiments, the electroactive mesh contains stainless steel, titanium oxide, carbon nanotubes, polymers, and/or graphite, or hybrid compositions of these materials. In some embodiments, the reactor comprises a plurality of electroactive meshes. In some embodiments, the plurality of electroactive meshes are arranged in a series of planar cells in parallel or cylindrical cells in parallel. In some embodiments, the reactor is in fluid communication with a desalination device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6(a) shows conceptual illustration of localized $OH^-$ generation on the FIG. 6(b) membrane cathode as a means to induce carbonate precipitation. The mass deposited on/near the membrane surface is removed using a rotating drum filtration solution. FIG. 6(c) shows the pH of the electrolyte for different overpotentials 1 s after electrical polarization as simulated using COMSOL Multiphysics© using adaptive time-stepping, triangular mesh elements (mesh opening of 173.21 μm²) and periodic boundary conditions. The breakdown potential of water is assumed as 0

$V_{RHE}$ (RHE: Reversible hydrogen electrode) (see *RSC Adv.* 2019, 9 (54), 31563-31571). This simulation considers a planar electrode (100 mm$^2$) that is composed of 304L stainless steel immersed in excess electrolyte (0.1 M NaCl) wherein for the hydrogen evolution reaction (HER), the Tafel relationship [$\eta=0.172+\log(i/i_0)$, where $\eta$ is the overpotential (V), i is the current density (A/m$^2$), and $i_0$ is the exchange current density (1.04×10$^{-7}$ A/m$^2$)] indicates: pH(t)=14+log[{(10$^{[(\eta-1.2)/0.172]}$t}9.6485+10$^{-7}$], where, pH is the average pH generated in the proximate saline electrolyte within a region that is 1 mm thick, $\eta$ is the overpotential (V) and t is time (s). For example, an overpotential of around 0.5 V is needed to generate a pH of 10 at the membrane surface at which all the inorganic carbon in solution is speciated in the form of $CO_3^{2-}$ anions. Expectedly, increasing the surface area (e.g., using a mesh) of the electrode or its electrochemical activity would reduce the overpotential needed to induce near-surface alkalinization.

Figure 7:
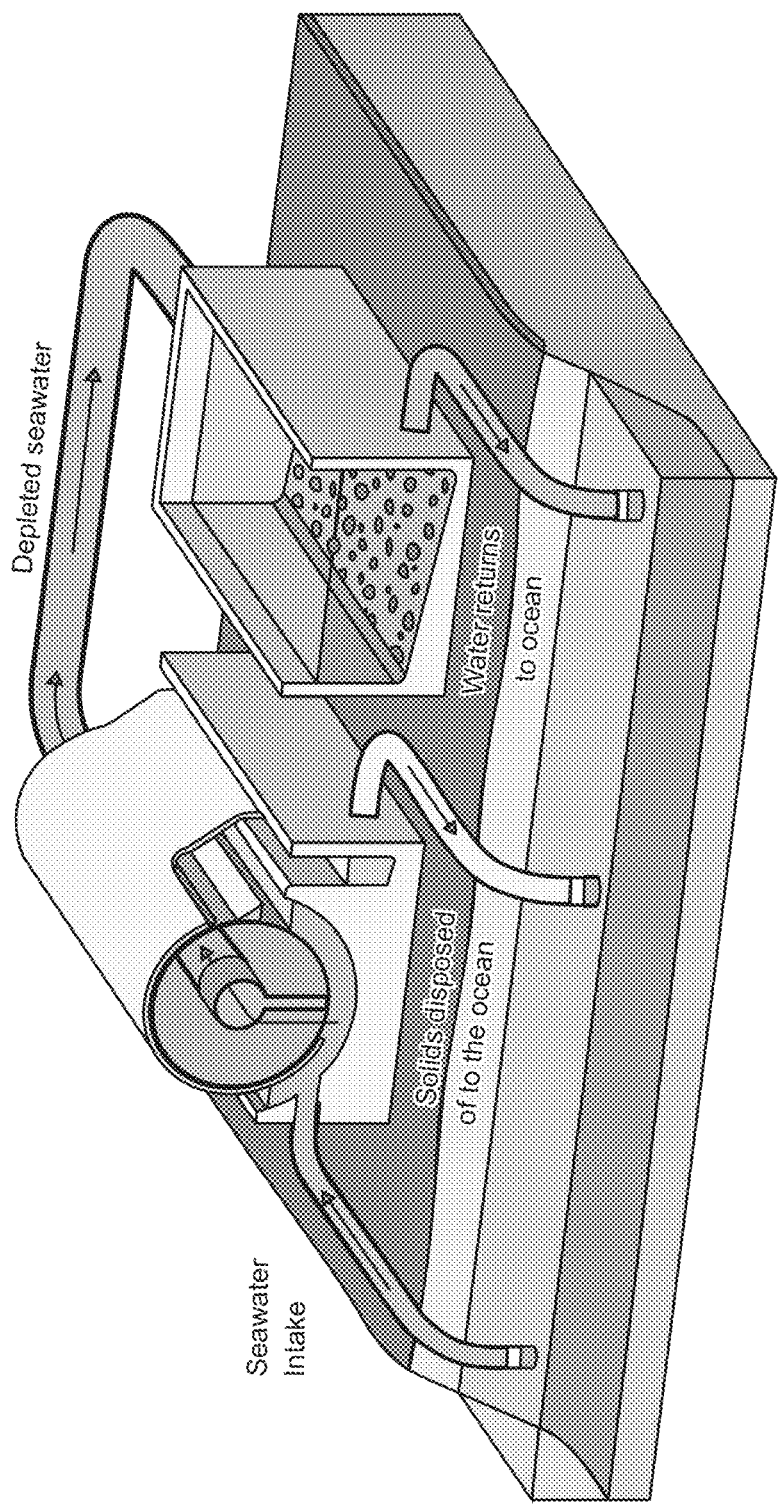

FIG. 7 shows a conceptual illustration of single-step carbon sequestration and storage for achieving $CO_2$ mineralization and disposal.

Figure 8A:
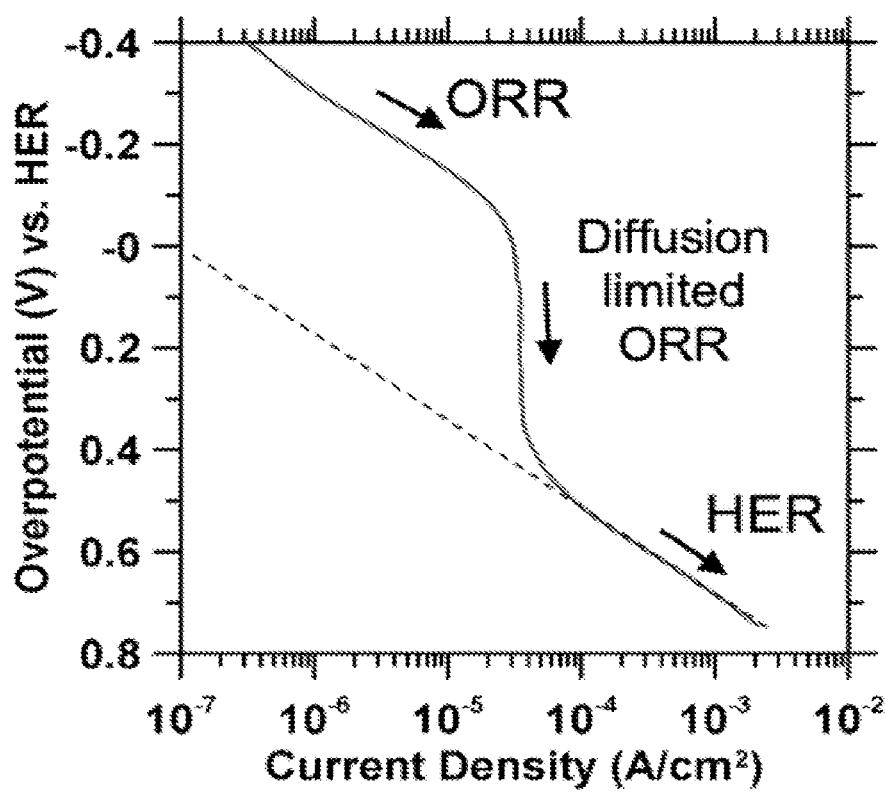
Figure 8B:
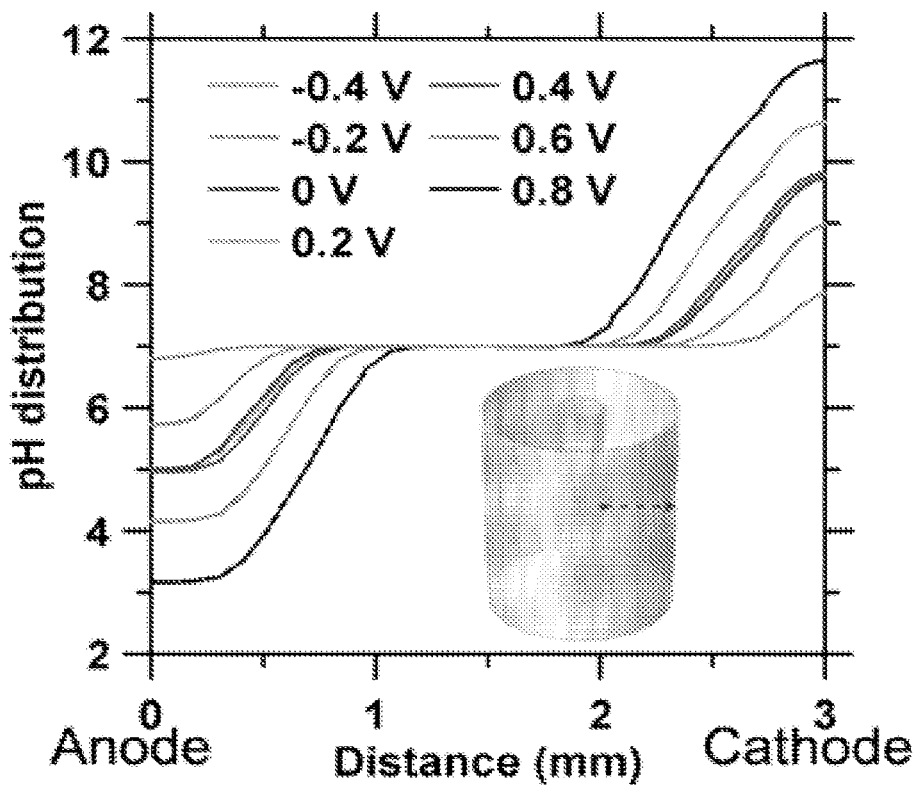

FIG. 8(a) shows cathodic polarization curve of 304L stainless steel in 0.1 M NaCl solution. The dashed line represents the Tafel fit of the hydrogen evolution reaction (HER): $\eta=0.172+\log(i/i_0)$, where $\eta$ is the overpotential (V), i is the current density (A/m$^2$), and $i_0$ is the exchange current density (1.04×10$^{-7}$ A/cm$^2$)], indicating that pH(t)= 14+log[{(10$^{[(\eta-1.2)/0.1272]}$) t}/9.6485+10$^{-7}$], in the electrolyte in a region that is 1 mm thick at time, t (s). FIG. 8(b) shows the equilibrium pH between the anode and cathode simulated as a function of the overpotential (e.g., the difference between the cell potential and the water breakdown potential, 1.23 V) for an annular reactor (inset). The pH is controlled by the production and mass-transfer of OH$^-$ and H$^+$ ions, and by acid-base neutralization (OH$^-$+H$^+$→H$_2$O).

Figure 9A:
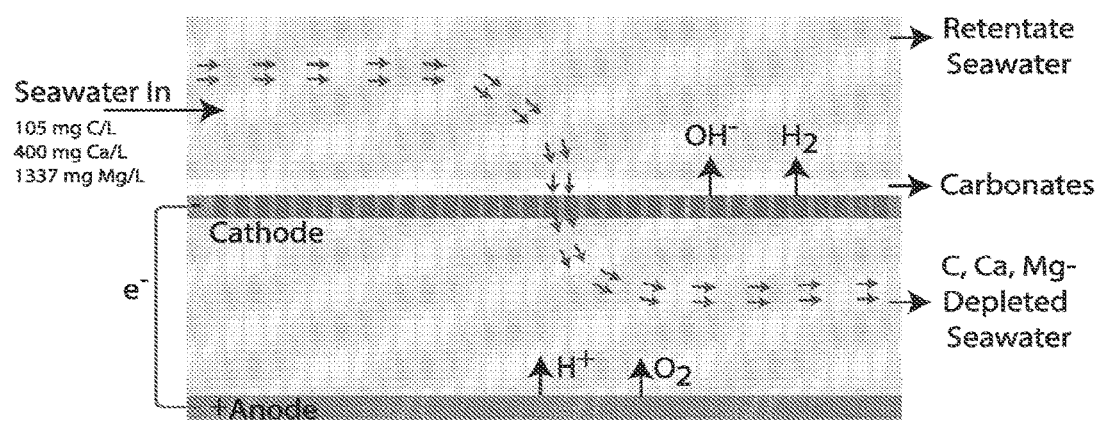
Figure 9B:
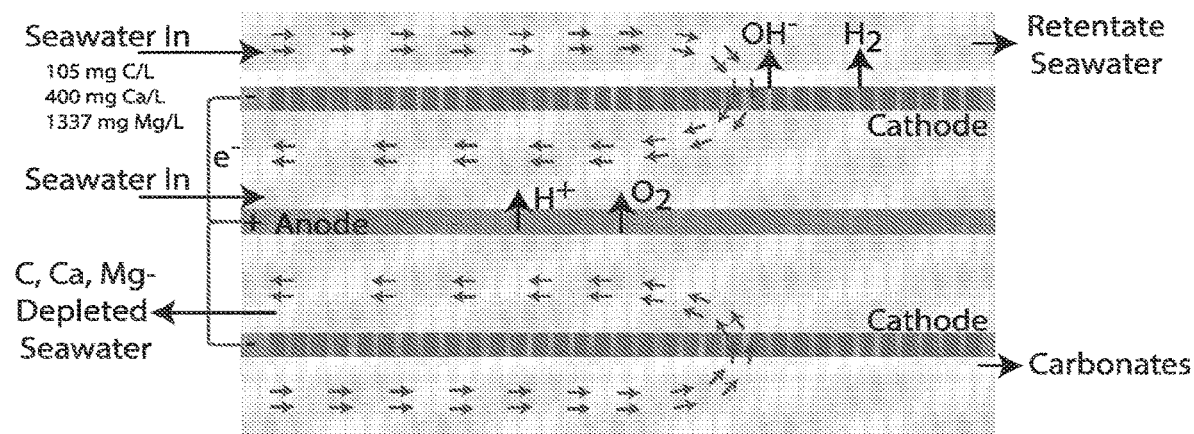

FIG. 9(a) shows a cross-sectional view of the electrolytic precipitator with planar geometry. FIG. 9(b) shows a cross-sectional view of the electrolytic precipitator with cylindrical geometry. In both configurations, the acidified (C,Ca,Mg)-depleted seawater outlet feed can be used for silicate weathering to enhance the alkalinity and pH of the effluent.

Figure 10A:
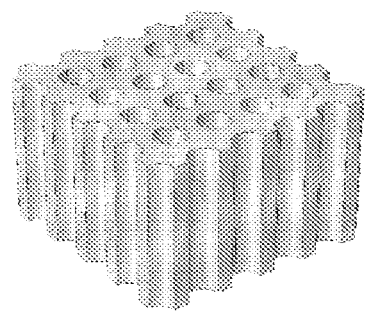
Figure 10B:
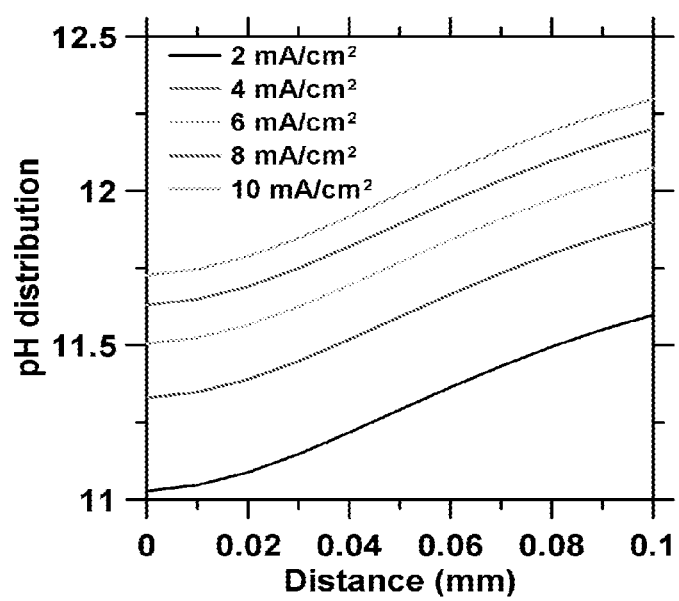
Figure 10C:
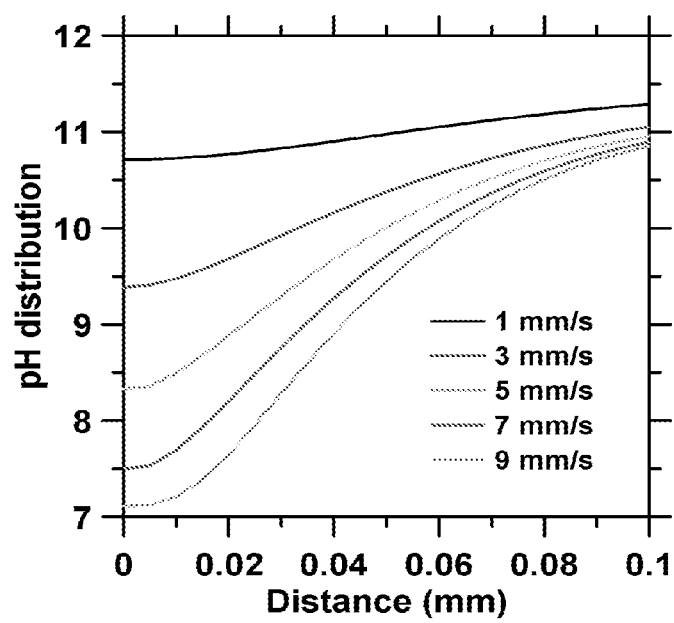

FIG. 10(a) shows a geometry of a 1 mm-thick mesh with cylindrical pores (100 µm, radius) as simulated using COMSOL Multiphysics©, e.g., cross-section of the cathode in FIG. 10(b). FIG. 10(a) shows the pH in the pore solution for different current densities for a flow velocity of 1 mm/s, and FIG. 10(c) shows the pH in the pore solution for different average flow velocities for a current density of 1 mA/cm$^2$.

Figure 11A:
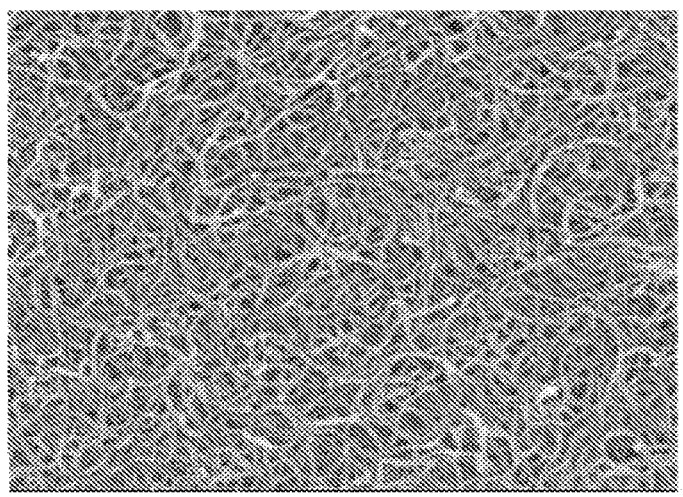
Figure 11B:
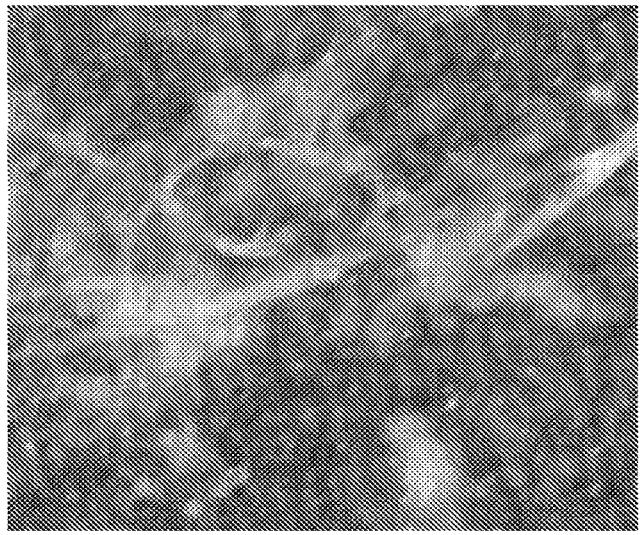

FIG. 11(a) shows carbon nanotube—polyvinyl alcohol (CNT-PVA) composite membrane showing the surface morphology, and pore size around 125 nm. FIG. 11(b) shows an optical image (FOV ~1 mm×1 mm) of an anodic-activated carbon (graphitic) electrode surface (pore size 20 µm) exposed to 10 mM CaCl$_2$ solution after application of 1 V (cell) potential in a flow-reactor, showing precipitates identified by thermogravimetric analysis as CaCO$_3$. Removal of dissolved Ca$^{2+}$ was further evidenced by the lower [Ca] at the outlet as compared to the inlet.

DETAILED DESCRIPTION

Certain embodiments of this disclosure are directed to methods of fixing $CO_2$.

In one aspect according to some embodiments, a method includes: introducing carbon dioxide into a solution; and inducing precipitation of a carbonate solid from the solution, wherein inducing precipitation of the carbonate solid includes performing water electrolysis on the solution. In some embodiments, introducing carbon dioxide into the solution is via a gas diffuser. In some embodiments, the solution contains (dissolved) carbon dioxide via equilibrium with the atmosphere. In some embodiments, performing water electrolysis on the solution includes increasing a pH of the feed solution. In some embodiments, performing water electrolysis on the solution includes generating hydroxide ions. In some embodiments, inducing precipitation of the carbonate solid includes rotating a membrane drum in the solution, while applying suction to draw the solution onto a surface of the membrane drum. In some embodiments, the solution is a brine solution. In some embodiments, the solution is an alkaline metal-containing solution. In some embodiments, inducing precipitation of the carbonate solid includes inducing precipitation of at least one of calcium carbonate or magnesium carbonate, or other carbonates (e.g., barium carbonates) or other related solids. In some embodiments, the method further includes enriching alkaline metal cations in the solution.

In another aspect according to some embodiments, a method includes: introducing carbon dioxide into a solution; and inducing precipitation of a carbonate solid from the solution, wherein inducing precipitation of the carbonate solid includes rotating a membrane drum in the solution, while applying suction to draw the solution onto a surface of the membrane drum. In some embodiments, introducing carbon dioxide into the solution is via a gas diffuser. In some embodiments, inducing precipitation of the carbonate solid includes performing water electrolysis on the solution. In some embodiments, performing water electrolysis on the solution includes increasing a pH of the feed solution. In some embodiments, performing water electrolysis on the solution includes generating hydroxide ions. In some embodiments, the solution is a brine solution. In some embodiments, the solution is an alkaline metal-containing solution. In some embodiments, inducing precipitation of the carbonate solid includes inducing precipitation of at least one of calcium carbonate or magnesium carbonate, or other carbonates (e.g., barium carbonates) or other related solids. In some embodiments, the method further includes enriching alkaline metal cations in the solution.

In another aspect according to some embodiments, a method of removing carbon dioxide from an aqueous stream or gaseous stream by: contacting the gaseous stream comprising carbon dioxide, when present, with an aqueous solution comprising ions capable of forming an insoluble carbonate salt; contacting the aqueous solution comprising carbon dioxide with an electroactive mesh that induces its alkalinization thereby forcing the precipitation of a carbonate solid from the solution and removal of dissolved inorganic carbon by electrolysis; and removing the precipitated carbonate solids from the solution, or the surface of the mesh where they may deposit. In some embodiments, the gaseous stream is present. In some embodiments, the gaseous stream comprises between about 0.04 to 100 vol. % $CO_2$ (e.g., about 0.04, 0.1, 0.2, 0.5, 1, 2, 3, 4, 5, 10, 20, 30, 40, 50, 60, 70, 80, 90, 95, 98, 99, 99.9 vol. % $CO_2$, and ranges therein between). In some embodiments, the gaseous fluid is atmospheric air. In some embodiments, the gaseous fluid is flue gas emitted from natural gas- and coal-fired power plants, iron and steel mills, cement plants, ethanol plants, and chemical manufacturing plants amongst others. In some embodiments, the aqueous solution contains an amount of dissolved carbon dioxide that is in equilibrium with the gaseous stream. In some embodiments, the aqueous solution is in thermal equilibrium with the gaseous stream, e.g., at temperatures 5° C.≤T≤100° C. In some embodiments, the aqueous solution is not in thermal equilibrium with the gaseous stream, e.g., at temperatures 5° C.≤T≤100° C. In some embodiments, the gaseous stream is not present. In some embodiments, the ions capable of forming an insoluble carbonate salt comprise ions including one or more of the following Ca, Mg, Ba, Sr, Fe, Zn, Pb, Cd, Mn, Ni, Co, Cu, and Al. In some embodiments, the aqueous solution has a concentration of NaCl of about 1,000 ppm or more. In some embodiments, the aqueous solution has a concentration of NaCl of about 30,000 ppm or more. In some embodiments, the aqueous solution has a concentration of NaCl of about 1000, 2000, 3000, 4000, 5000, 10000, 20000, 30000, 40000, 50000, 60000 ppm, and ranges therein between. In some embodiments, the aqueous solution comprises seawater or brackish water or brine. In some embodiments, the electroactive mesh comprises a mesh cathode that comprises a metallic or a non-metallic composition. In some embodiments, the method utilizes an end-to-end energy intensity of about 2.5 MWh or less per ton of carbon dioxide mineralized. In some embodiments, the aqueous solution contains an amount of dissolved carbon dioxide that is buffered to atmospheric abundance. In some embodiments, the electroactive mesh produces an increased alkaline condition, in situ, in the aqueous solution within about 2 to 20000 µm of the electroactive mesh. In some embodiments, the alkalinized condition is a pH of 9 or greater (e.g., a pH of about 9, 10, 11, 12, 13, 14 and ranges therein between). In some embodiments, the electroactive mesh comprises a metallic or carbon-based mesh. In some embodiments, the electroactive mesh contains stainless steel, titanium oxide, carbon nanotubes, polymers, and/or graphite, or other hybrid compositions of these materials (e.g., metal/polymer, metal/nonmetal, metal/ceramic). In some embodiments, the electroactive mesh comprises pores having a diameter in the range of about 0.1 µm to about 10000 µm (e.g., about 10, 50, 100, 200, 300, 400, 500, 1000, 1500, 2000, 3000, 4000, 5000, 6000, 7000, 8000, 9000, or 10000 µm). In some embodiments, inducing the precipitation of the carbonate solid includes rotating a cylinder consisting of the electroactive mesh in the solution, while applying suction to draw the solution onto the outer surface of the mesh. In some embodiments, the solution is an alkaline metal-containing solution. In some embodiments, inducing precipitation of the carbonate solid includes inducing precipitation of at least one carbonate having Ca, Mg, Ba, Sr, Fe, Zn, Pb, Cd, Mn, Ni, Co, Cu, and Al.

In another aspect according to some embodiments, a flow-through electrolytic reactor comprising an intake device in fluid connection with a rotating cylinder comprising an electroactive mesh, and a scraping device and/or liquid-spray based device for separating a solid from the mesh's surface/solution. In some embodiments, the flow-through electrolytic reactor of further comprises an aqueous solution comprising carbon dioxide, Ca ions, and Mg ions. In some embodiments, the electroactive mesh is capable of inducing removal of dissolved inorganic carbon by precipitation of a carbonate solid from an aqueous solution comprising carbon dioxide and ions capable of forming an insoluble carbonate salt. In some embodiments, the electroactive mesh contains a metallic or carbon-based mesh. In some embodiments, the electroactive mesh contains stainless steel, titanium oxide, carbon nanotubes, polymers, and/ or graphite, or other hybrid compositions. In some embodiments, the reactor comprises a plurality of electroactive meshes. In some embodiments, the plurality of electroactive meshes are arranged in a series of planar cells in parallel or cylindrical cells in parallel. In some embodiments, the reactor is in fluid communication with a desalination device.

$CO_2$ can be fixed within stable mineral carbonates. The basis of the strategy is the precipitation of solid calcium carbonate ($CaCO_3$), magnesium carbonate ($MgCO_3$), and their variants, from a combination of gaseous $CO_2$ with $Ca^{2+}$ and/or $Mg^{2+}$ ions (or other ions capable of forming an insoluble carbonate salt, such as Ba, Sr, Fe, Zn, etc.) sourced from liquid and solid streams, within an aqueous medium. The mineralized carbon can then be disposed of at the Earth's surface or expelled into the ocean. The large carbon storage capacity, minimal environmental impact, and low risk of late $CO_2$ release support the viability of the scheme as a primary pathway of long-term Gt-scale $CO_2$ waste management.

A basic $CO_2$ mineralization process can be achieved by adding a strong base such as NaOH to a circumneutral Ca— and Mg-containing feed solution (e.g., pure water containing about 10 millimolar (mM) $CaCl_2$ and about 55 mM $MgCl_2$) similar to seawater, as described in the following. The feed solution can also be composed of liquid streams such as alkaline metal-rich groundwater, industrial wastewater, desalination brine, and so forth. Alkaline cation enrichment composes an optional pretreatment stage to increase aqueous concentrations of Ca, Mg, and other alkaline cations. Enrichment can be attained by filtration, capacitive concentration, or a combination thereof. Then, effective mixing and $CO_2$ equilibration can be attained to yield $CO_2$-rich water using an aeration tank such as those used in an activated sludge process in wastewater treatment. A base (e.g., NaOH) can be blended into the $CO_2$-rich water, such as used in processes of coagulation and flocculation for water treatment, resulting in the precipitation of $CaCO_3$ and $MgCO_3$. The precipitates can be separated by sedimentation and the discharge solids can either be further dewatered for landfill or discharged into the ocean similar to brine disposal in desalination plants.

Figure 1:
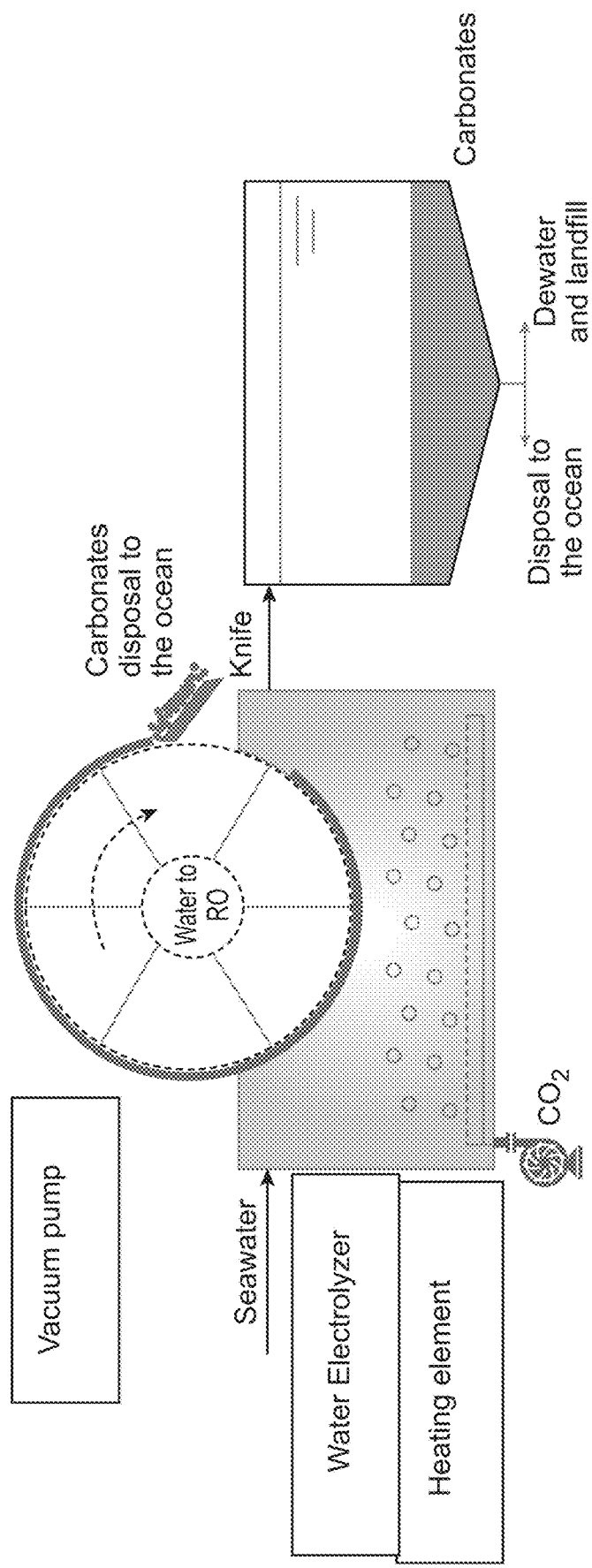
FIG. 1 shows an embodiment of a carbon dioxide mineralization and disposal process. The heating element and diffuser are optional components.

The thermodynamics and kinetics of carbonate mineralization can be further enhanced with localized pH and temperature shifts induced on membrane surfaces. Instead of adding consumable reagents, an advanced $CO_2$ mineralization process involves a carbon dioxide mineralization and disposal apparatus that generates hydroxide ions ($OH^-$) by water electrolysis (via a water electrolyzer) and increases temperature at the site (via a heating element). A more basic solution increases the driving force for carbonate precipitation, and the generation of $OH^-$ by water electrolysis increases the pH of a liquid to promote carbonate precipitation. Similarly, a higher temperature increases the driving force for carbonate precipitation, and the use of the heating element increases the temperature of the liquid to promote carbonate precipitation. $CO_2$ is optionally injected or otherwise introduced into the liquid via a gas diffuser and a compressor; or may present in the liquid at a level in equilibrium with its gaseous atmosphere. As shown in FIG. 1, the design of the apparatus is in the form of a rotary vacuum membrane drum rotating in the $CO_2$-rich and Ca—/Mg-containing liquid (for example, seawater or other brine solution) disposed within a tank. The membrane drum includes a membrane (e.g., a metallic membrane in the form of a mesh or sieve) as a filtration medium surrounding a central duct through which suction (or a negative pressure) is applied. Carbonates can form at a surface of the membrane as the membrane drum rotates through the liquid. A vacuum pump is connected to the central duct and applies suction to draw the liquid onto and through the membrane surface where $Ca^{2+}$ and $Mg^{2+}$ precipitate with $CO_3^{2-}$ as carbonates. The Ca—/Mg-poor filtrate flows to an interior of the membrane drum and is pumped away. The carbonate solids adhere to the outside of the membrane drum, which then passes a knife to remove the solids from the membrane, thereby regenerating the membrane surface for subsequent carbonation as the drum rotates back into the liquid. This advanced process also provides the possibility for process integration with/within desalination plants, simultaneously addressing issues of $CO_2$-driven climate change and scaling problems (which is caused by accumulation of $Ca^{2+}$ and $Mg^{3+}$ compounds on membrane surfaces) in membrane desalination plants.

EXAMPLES

The precipitation of calcium carbonate, e.g., calcite, is given by:

$$CaCO_3(\text{calcite}) \rightleftharpoons Ca^{2+} + CO_3^{2-}, \log K_{sp} = -8.48 \text{ at } 25°C, \quad [1]$$

where $K_{sp}$ is the solubility product (also known as the equilibrium constant) and is equal to the product of the aqueous activities of $Ca^{2+}$ and $CO_3^{2-}$, at equilibrium. During precipitation of calcite, either $HCO_3^-$ or $CO_3^{2-}$, both formed through the speciation of $CO_2$ in water, may adsorb and incorporate on the growing surface. The $K_{sp}$ of $CaCO_3$ decreases with temperature, such that raising the temperature of a calcite-saturated solution from 25° C. to 90° C. results in the precipitation of calcite with a yield of around 300 μmol/kg of water. The speciation reactions and dissociation constants that describe the $CO_2$—$H_2O$ system are written as:

$$H_2CO_3^* \rightleftharpoons HCO_3^- + H^+, \log K_1 = -6.35, \text{ and} \quad [2]$$

$$HCO_3^- \rightleftharpoons CO_3^{2-} + H^+, \log K_2 = -10.33 \quad [3]$$

where $H_2CO_3^*$ denotes the total $CO_2$ (aq) and $H_2CO_3^0$. The partitioning of dissolved $CO_2$ is disclosed by a Bjerrum diagram. In general, the activity of $CO_3^{2-}$ anions depends on pH (e.g., in water, $CO_3^{2-}$ is the dominant carbon species at pH>10.33), and so does the extent of calcite precipitation. Higher salinities shift $K_1$ and $K_2$ to greater values, and thus the pH where $HCO_3^-$ and $CO_3^{2-}$ ions are dominant shifts to lower values. The thermodynamic driving force for mineral precipitation is given by the saturation ratio, $\Omega = IAP/K_{sp}$, where IAP is the ion activity product; e.g., for calcite this is the product of the activities of $Ca^{2+}$ and $CO_3^{2-}$ in solution. This is of relevance to typical natural waters (e.g., ground water, seawater, produced water) that contain divalent metal cations since their circumneutral pH requires the provision of supplemental alkalinity to induce carbonate precipitation. Because Ca and Mg are the most abundant divalent cations in natural waters, and often industrial waters (e.g., produced water, thermoevaporation brines, etc.); these waters are represented as $CaCl_2$ solutions—since dominantly, $Cl^-$ offers charge-compensations to cations in these systems.

Figure 2A:
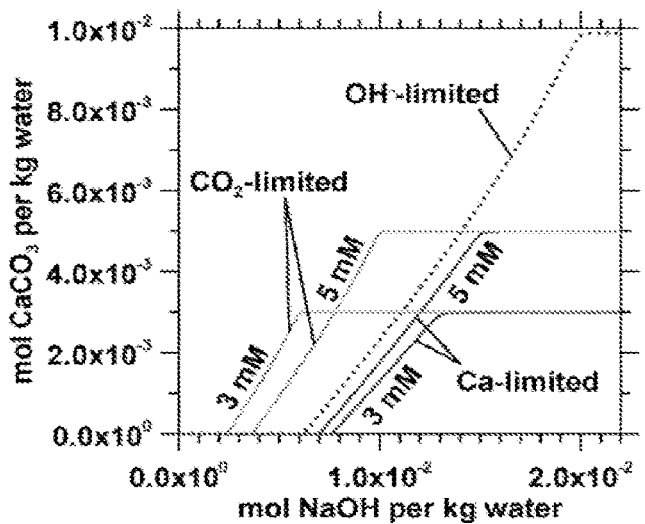
FIG. 2(a) shows representative calculations demonstrating the limits on calcite precipitation as affected by Ca, $CO_2$, or alkalinity for a solution of composition: [Ca]=10 mM, [Cl]=20 mM, [$CO_2$]=10 mM (~30% $CO_2$, 300000 ppm), pH=4.16 (dotted curve). The maximum $CaCO_3$ yield is 10 mmol per kg water. If [Ca] is decreased to 3 mM or 5 mM (dark blue curves) ([Cl] is either 6 mM or 10 mM), [$CO_2$]=10 mM, pH=4.17, the maximum $CaCO_3$ yield decreases to 3 mM and 5 mM. Similarly, decreasing [$CO_2$] to 3 mM (light blue curves) (~9% $CO_2$, pH=4.42) or 5 mM (~15% $CO_2$, pH=4.31) ([Ca]=10 mM, [Cl]=20 mM) decreases the maximum $CaCO_3$ yield. Interestingly, whereas decreasing [Ca] leads to an increase in NaOH consumption for an equivalent $CaCO_3$ yield, decreasing [$CO_2$] decreases NaOH consumption.

The addition of NaOH raises the solution's pH and $\Omega_{calcite}$, resulting eventually in calcite precipitation. For a solution of a fixed initial $CO_2$ concentration ($pCO_2$), calcite precipitation is limited either by the abundance of Ca, $CO_2$, or alkalinity (pH). These scenarios are illustrated in FIG. 2(a), which considers a $CaCl_2$ solution with added $CO_2$, at various concentrations of Ca, $CO_2$, or alkalinity. Although less acidic solutions (e.g., having lower $CO_2$ concentrations) require smaller amounts of NaOH to initiate calcite precipitation, the maximum $CaCO_3$ yield, which in this scenario is limited by $CO_2$, can accordingly be lower (light blue curves in FIG. 2a). On the other hand, excess $CO_2$ in solution can render Ca the limiting reactant. The case wherein both $NaOH:CaCO_3$ and $H_2O:CaCO_3$ molar ratios are minimized is one in which Ca and $CO_2$ molar concentrations are approximately equal and NaOH (representative of alkalinity) is added until the maximum $CaCO_3$ yield is achieved (dotted curve in FIG. 2a). The addition of NaOH results in the complexation of $Na^+$ with $CO_3^{2-}$; thus, the molar ratio between $CO_2$ and Ca to reach equivalence between $\{CO_3^{2-}\}$ and $\{Ca^{2+}\}$, where the brackets $\{\ \}$ denote the activity, is slightly higher than 1. The molar ratio between NaOH consumed and $CO_2$ sequestered as $CaCO_3$ is at the minimum 2 (e.g., which offers one mole of $OH^-$ for each of reactions [2] and [3]).

Figure 2B:
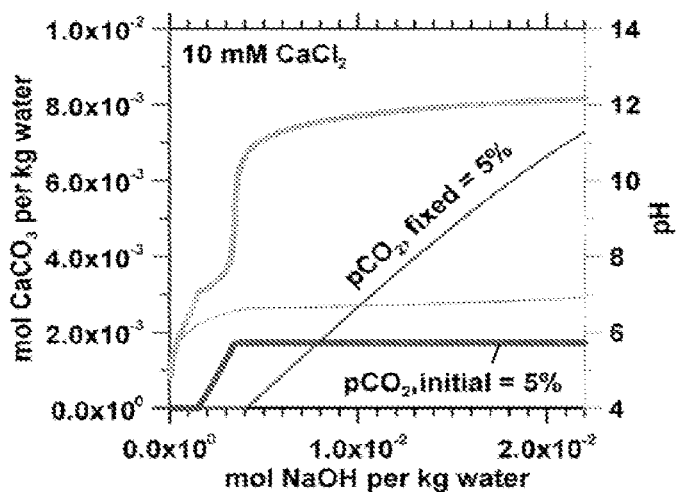
FIG. 2(b) Two scenarios are compared: (i) the initial $pCO_2$ is 5%, corresponding to 1.73 mM $CO_2$ (bold curves), and allowed to decrease with precipitation, and (ii) the solution's $pCO_2$ is held constant (e.g., by continuous equilibration with a gaseous $CO_2$ stream at 17300 ppm) at 5% (thin curve). In (i), $CaCO_3$ precipitation is induced rapidly by NaOH addition and is limited by the total dissolved $CO_2$, as in FIG. 2(a). The continuous supply of $CO_2$ in (ii) enables $CaCO_3$ precipitation at a yield of around 7 mM (limited by [Ca]).
Figure 2C:
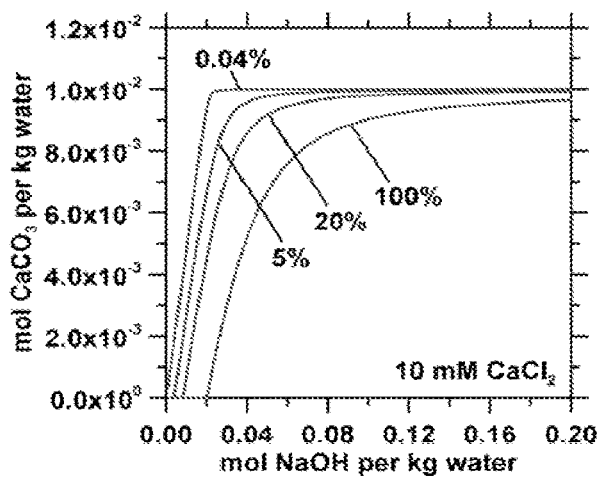
FIG. 2(c) NaOH consumption for calcite precipitation for a solution in equilibrium with $CO_2$ at different $pCO_2$ levels (in vol. %) as dictated by Henry's Law.
Figure 3:
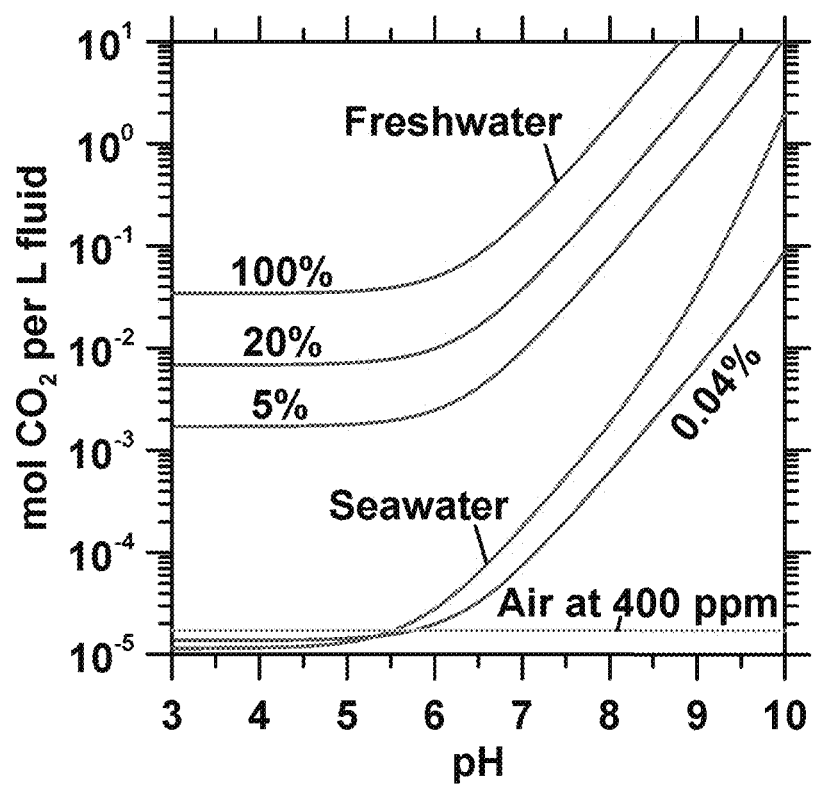
FIG. 3 shows total dissolved carbon content as a function of pH for a solution in equilibrium with gaseous streams of $CO_2$ across a range of gas-phase concentrations. The total dissolved $CO_2$ is equal to $[H_2CO_3^*]+[HCO_3^-]+[CO_3^{2-}]$. For reference, 0.04% represents the concentration of $CO_2$ in air. The $CO_2$ content in air is shown for comparison.

For liquid streams which feature low $CO_2$ concentrations, air can be bubbled through the aqueous feed in relation to the rate of $CO_2$ consumption. To illustrate this, two scenarios are compared in FIG. 2(b): one in which the initial $CO_2$ concentration is fixed and dissolved carbon is progressively depleted, and another in which the solution's $CO_2$ concentration is held constant by equilibration with a gas stream which features a fixed $pCO_2$. In the first case, $CaCO_3$ precipitation is induced rapidly by NaOH addition and is limited by the total dissolved $CO_2$, whereas in the second case, the replenishment of $CO_2$ enables calcite precipitation until Ca depletion. In the second scenario, precipitation is initially inhibited because of excess acidity, e.g., $CO_2$. For completeness, different scenarios of $CO_2$ equilibrium/replenishment for varying $pCO_2$ levels are shown in FIG. 2(c). In the limit, the carbonate yield is dependent only on the feed's [Ca] abundance and is invariant with the $CO_2$ concentration. The amount of $CO_2$ that can dissolve in water is controlled by its pH and the salinity- and temperature-dependent Henry's law constant. For a given solution, increasing the solution pH (pH>6) increases total dissolved carbon (FIG. 3). This is on account of the pH-dependent speciation of $CO_2$ (aq) to $HCO_3^-$ and $CO_3^{2-}$, which reduces the concentration of $CO_2$ (aq), allowing for further dissolution of $CO_2$ (g) as per Henry's law. It is for this reason that the formation of cation-carbonate and-bicarbonate complexes in seawater increases its carbon storage capacity relative to freshwater at pH>6.

Carbonate precipitation reactions are characterized by a time-scale. Under well-mixed conditions (e.g., free of mass transport limitations) at 25° C. and 1 atm, the equilibrium described by reaction [4] occurs within $t = 5.0 \times 10^{-11}$ s.

$$CO_2(g) \rightleftharpoons CO_2(aq) \quad [4]$$

The aqueous species $H_2CO_3$, $HCO_3^{2-}$, and $CO_3^{2-}$, as described by reactions [5]-[7] reach equilibrium within $10^{-2}$ s.

$$CO_2(aq) + H_2O \rightleftharpoons H_2CO_3 \quad [5]$$

$$H_2CO_3 \rightleftharpoons H^+ + HCO_3^- \quad [6]$$

$$HCO_3^- \rightleftharpoons H^+ + CO_3^{2-} \quad [7]$$

However, equilibrium with respect to $Ca^{22+}$ (i.e., reactions [8] and [9]) is only reached in $10^3$ s.

$$Ca^{2+} + CO_3^{2-} \rightleftharpoons CaCO_3(aq) \quad [8]$$

$$CaCO_3(aq) \rightleftharpoons CaCO_3(s) \quad [9]$$

In alkaline solutions (pH>10), the alternative pathway of $CO_2$ solvation by reaction with $OH^-$ to form $HCO_3^-$ is even faster ($k = 8.5 \times 10^3$ $M^{-1}$ $s^{-1}$) than that with $H_2O$ ($k = 6.6 \times 10^{-4}$ $M^{-1}$ $s^{-1}$). Calcite precipitation rates in concentrated solutions similar to seawater (≥0.5 M NaCl) indicate a precipitation rate constant on the order of $3.2 \times 10^6$ $M$ $s^{-1}$; with a yield that is consistent with FIG. 2(c). This rate constant is derived by fitting experimental (calcite precipitation) data using an equation of the form: $R=k(\Omega-1)^n$, where R is the precipitation rate in $M \cdot s^{-1}$, k is the rate constant in $M \cdot s^{-1}$, $\Omega$ is the saturation ratio with respect to calcite, and n is the reaction order. Thus, in a well-mixed system with low mass transport resistances, the reaction with $Ca^{2+}$, e.g., $CaCO_3$ precipitation, is rate limiting. This allows analysis of mass and energy balances for $CO_2$ mineralization hereafter.

Figure 4:
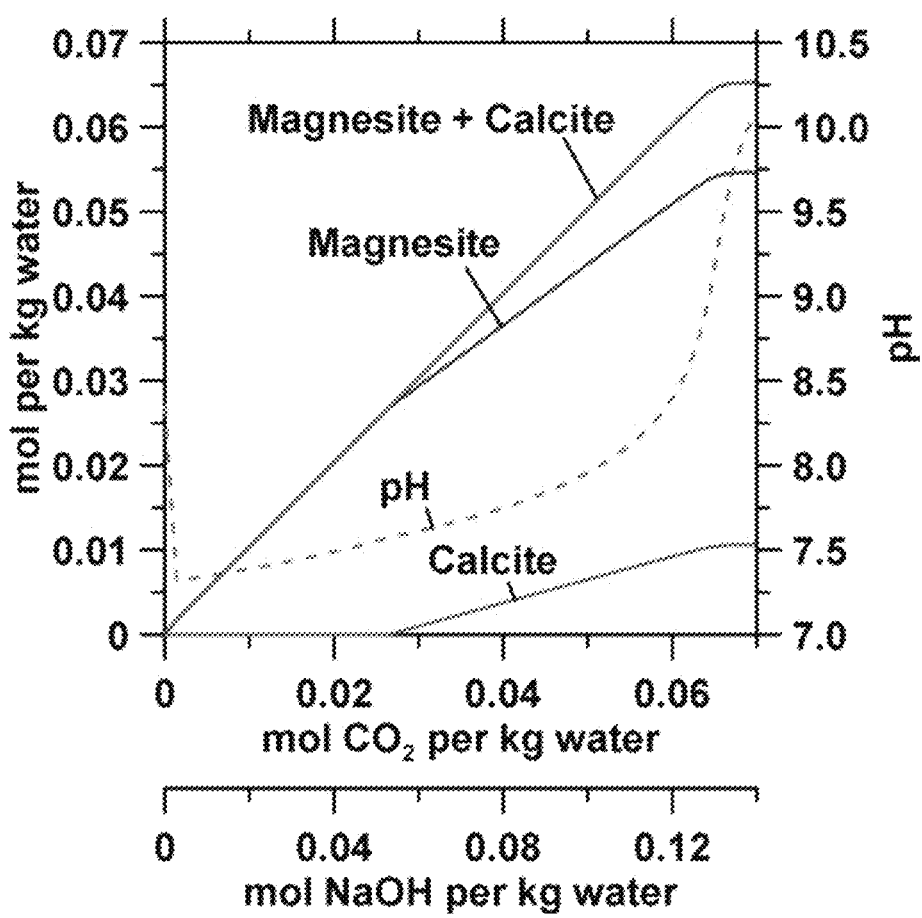
FIG. 4 shows representative equilibrium calculations using PHREEQC with the llnl.dat database for a reference seawater composition as given by Millero et al. (*Deep Sea Research Part I: Oceanographic Research Papers* 2008 55 (1), 50-72). The simultaneous addition of $CO_2$ and NaOH at a 1:2 molar ratio results in the precipitation of calcite and magnesite, up to about ~55 mmol magnesite and ~10 mmol calcite per kg water. The $CO_2$ saturation concentration at atmospheric pressure is ~34 mM. In an engineered process, $CO_2$ equilibrium can be maintained by simply bubbling air over the course of carbonate precipitation (see FIGS. 2b, 2c).

Establishing the Baseline. In general, the analysis above indicates that alkalinity promotes carbonate precipitation. Thus, foremost, a typical approach of addition of a strong base such as NaOH to a circumneutral Ca— and Mg-containing solution was examined (FIG. 4). For reference, it should be noted that the $CO_2$ concentrations from point source emissions are around 3% for natural gas-fired power plants, 15% for coal-fired power plants and iron and steel mills, 20% for cement plants, and >90% from ammonia, ethanol, and hydrogen plants (vol. %). On the other hand, the atmospheric $CO_2$ concentration is around 0.04%, whereas $CO_2$ captured by amine scrubbing can be more than 99% pure. Therefore, reference concentrations of 0.04%, 5%, 20%, and 100% are included in this analysis. $CO_2$ mineralization as envisaged in the baseline case is modeled by analogy to water treatment processes. First, if $CO_2$ sources other than air are to be used, effective mixing and $CO_2$ equilibration with saline water can simply be achieved using aeration tanks similar to those used in activated sludge processing. Thereafter, NaOH could be mixed into the $CO_2$-rich water, as in coagulation and flocculation processes, resulting in the precipitation of $CaCO_3$ and $MgCO_3$. The precipitates are then separated from the solution by sedimentation and the discharge solids can be dewatered using belt presses or discharged into the ocean similar to brine disposal in desalination.

Ascertaining calcium and magnesium sufficiency for carbonate mineralization. Ca and Mg are available in more than sufficient quantities to meet the demands of global-scale carbon management. For example, the removal of 10 Gt of $CO_2$ per year requires 9.1 Gt Ca or 5.5 Gt Mg, equivalent to 0.0017% of the total Ca and 0.00032% of the total Mg contained in the world's oceans ("seawater"). Alternately, although at much smaller levels, calcium and magnesium can be sourced from: (a) saline groundwater that can contain more than 1,000 mg per L of total dissolved solids (TDS), whose withdrawal rates in 2015 reached 3.2 billion $m^3$ per year, corresponding to 0.6 Mt Ca and 0.3 Mt Mg (using typical Ca and Mg concentrations in brackish waters in the U.S.) (b) desalination brines that are produced globally at a rate of 50 billion $m^3$ per year can supply an additional 0.04 Gt Ca and 0.1 Gt Mg annually, and (c) the generation of 2.23 Gt per year of produced water which in the U.S. alone, assuming an average Ca concentration of 5,000 mg per L, can provide an additional 0.01 Gt Ca per year. While alkaline byproducts resulting from the manufacturing of metals, alloys, and cement, and from coal combustion are rich in Ca and Mg, their weathering too is postulated to fix no more than 0.3 Gt $CO_2$ per year. All that said, seawater remains the most viable and abundant source of divalent metal ions for mineralization processes.

From stoichiometry, the conversion of 1 mol $CO_2$ to 1 mol $CaCO_3$ requires 2 mol NaOH (see FIGS. 2a and 4). Therefore, the mineralization of 10 Gt of $CO_2$ requires, at the minimum, approximately 18 Gt NaOH. However, global production of NaOH is comparatively trivial; on the order of 70 Mt in 2016, although simply based on its Na-content, $3.2 \times 10^{-7}$ Gt NaOH could be synthesized using ocean water. To meet this demand, one would need 6,000 large chlor-alkali plants, each producing 3 Mt NaOH annually; an unfeasible proposition. The dosage of NaOH in sufficient quantities, to seawater ([Mg]=≈55 mM, [Ca]=≈10 mM), has the potential to convert 2.86 g $CO_2$ to $MgCO_3$ and $CaCO_3$ per kg water (FIG. 4). Thus, to sequester 10 Gt $CO_2$ per year, around 3500 Gt of water would need to be processed annually; a quantity similar to our global annual level of water withdrawal (approximately 4000 Gt). On the other hand, 47 Gt of wastewater are processed annually in more than 14,700 treatment plants in the U.S. If a single $CO_2$ abatement facility were to process 2000 Mt (e.g., the size of a large wastewater treatment plant) of seawater per year, then 1760 such plants would need to be built, globally, with each plant being supplied with 10 Mt NaOH per year. Because the carbonate yield is limited by the content of divalent cations in the feed, enriching the Ca and Mg concentrations in the feed-stream (e.g., using membranes that can selectively separate divalent cations) would allow for the processing of a smaller quantity of water. Such pre-treatment, can obviously only be fulfilled while incurring a substantial energy penalty which appears unviable; in spite of the increase in the carbonate yields that would result.

Figure 5:
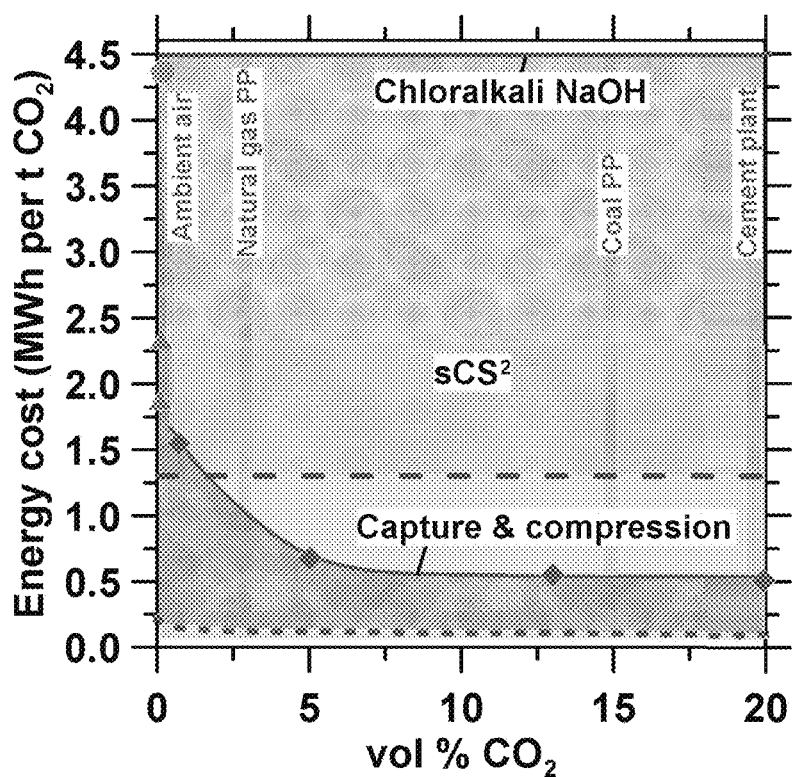
FIG. 5 shows energy requirements for $CO_2$ capture and compression as a function of concentration for an amine-based process simulated using Aspen Plus® (solid red curve). The thermodynamic minimum energy (dotted red curve) required for $CO_2$ separation from a mixture and compression from 1 atm to 15 MPa, is calculated based on the entropy of (de)mixing gas phase $CO_2$. Also shown are the energy costs for $CO_2$ mineralization (solid blue line) for chloralkali-produced NaOH (dashed blue line) at the thermodynamic minimum energy demand for production. The theoretical energy requirement for NaOH production from NaCl is taken from Thiel et al. (*ACS Sustainable Chem. Eng.* 2017, 5 (12), 11147-11162). The energy costs for direct air capture and compression (DACC; magenta triangles) using a $KOH/K_2CO_3$ process and integrated caustic-amine (green circle) are taken from Keith et al. (*Joule* 2018, 2 (8), 1573-1594, *Climatic Change* 2006, 74 (1), 17-45) respectively. The vertical gray lines represent $CO_2$ concentrations in air, natural gas- and coal-fired power plants, and cement plant flue gas. The shaded areas represent representative ranges of energy cost for the following $CO_2$ mitigation strategies: (red) capture and compression (range: 0.1 MWh, at the thermodynamic minimum-to-4.5 MWh per tonne of $CO_2$; depending on concentration), (blue) stoichiometric addition of electrolytically synthesized NaOH (range: 1.26 MWh, at the thermodynamic minimum-to-4.5 MWh per tonne of $CO_2$), and (yellow) the electrolytic precipitation approach (single-step carbon sequestration and storage) (range: 0.07 MWh, at the thermodynamic minimum-to-2.3 MWh per tonne of $CO_2$; independent of concentration).

Energy intensity analysis. The energy demand of a mineralization process that uses seawater as a source of divalent cations, and NaOH as a stoichiometric additive can be estimated for comparison with a geological CCSS strategy. Unlike geological CCSS, seawater mineralization-based $CO_2$ abatement does not require a $CO_2$ capture step. Thus, the energy requirements of the baseline process (although practically infeasible) are based around the needs of: water handling and processing, and NaOH production. Water handling and processing includes: (a) seawater intake which requires around 1.3 kWh per t of $CO_2$ mineralized, (b) chemical dispersion which requires between 2.8-7.7 kWh per t of $CO_2$ mineralized, and (c) sedimentation which requires 0.175 to 0.35 kWh per t of $CO_2$ mineralized. Thus, in total, water processing and handling can consume around 5 kWh per t of $CO_2$ mineralized assuming a seawater feed. The synthesis of NaOH by the chlor-alkali process requires 2.5 MWh per t NaOH. Therefore, that the energy demand for direct $CO_2$ mineralization—using seawater as a source of both divalents, and (solubilized) $CO_2$—is estimated to be on the order of 4.5 MWh per t $CO_2$ (FIG. 5). Thus, the cost of $CO_2$ removal estimated from the price of electricity for industrial use of about $70 per MWh, is $315 per t $CO_2$ for current best-in-class chlor-alkali produced NaOH. The need for NaOH may be somewhat reduced by carbonating alkaline solids, e.g., whose dissolution produces alkaline metals ($Ca^{2+}$, $Mg^{2+}$) and $OH^-$ in solution. The energy input for such direct carbonation includes pretreatment costs including grinding and, in some cases, thermal activation, (carbonate) product disposal, and the operation of pumps and mixers, and is on the order of 0.5 MWh per t $CO_2$, all inclusive. Unfortunately, such direct carbonation of industrial alkaline solids is expected to deliver not more than 0.3 Gt of $CO_2$ abatement per year. A somewhat less energy intensive pathway of NaOH production may be achieved by bipolar membrane electrodialysis. Even if it were possible to produce NaOH at its theoretical minimum energy demand of 0.7 MWh per t NaOH (45% NaOH with a co-product, HCl, that can be used for enhanced silicate dissolution) the cost of mineralization-based $CO_2$ management, would at the minimum, be associated with an energy intensity of 1.26 MWh per t $CO_2$ (dashed blue horizontal line in FIG. 5); e.g., corresponding to a cost of no less than $90 per t of $CO_2$ converted into solid carbonates using seawater-derived divalent cations.

The energy intensity of the traditional CCSS pathway is estimated by considering a monoethanolamine (MEA) based process consisting of an absorber, stripper, cooler, and four-stage compressor using Aspen Plus® with the eRNTL thermodynamic property method (see FIG. 5). Herein, $CO_2$-depleted gas was assumed to be extracted from the top of the absorber while the $CO_2$-rich solvent stream is extracted from the bottom. To release $CO_2$, the $CO_2$-rich amine is heated to fulfill the enthalpy of desorption. An overhead condenser provides a reflux liquid stream to the column and purifies the $CO_2$-rich gas to nearly 100% $CO_2$. The near pure $CO_2$ stream released from the stripper is compressed and transmitted for geological storage. Considering an inlet stream with 3% $CO_2$ (e.g., corresponding to the flue gas emitted from a natural gas fired power plant), an energy intensity of ~1.5 MWh per t of $CO_2$ is estimated for amine-based $CO_2$ capture (heat duty for amine regeneration of 1.3 MWh per tonne) and for pressurization of the recovered $CO_2$ stream (0.2 MWh per tonne) from atmospheric pressure to a pipeline specification at 14 MPa (see FIG. 5; solid red curve). This energy intensity decreases to 0.8 MWh per tonne $CO_2$ as the concentration of $CO_2$ in the inlet stream increases to ~12% (for a coal-fired power plants; 0.6 MWh for carbon capture, and 0.2 MWh for compression per tonne of $CO_2$); remaining constant thereafter. However, at inlet $CO_2$ concentrations below 3% $CO_2$, the energy intensity of an amine-based process sharply increases. The low capacities of amines in contact with air (~0.25 mol per mol) would require more than 5.0 MWh per ton $CO_2$ of reboiler duty to achieve less than 0.05 mol per mol of working capacity. This indicates a particular advantage of alternate mineralization processes to be less energy intensive, operationally speaking, for cases wherein $CO_2$ feed-streams are exceptionally dilute, such as in the removal of $CO_2$ from the atmosphere; or atmosphere-equilibrated water.

Single-step carbon sequestration and storage ($sCS^2$): The discussion above demonstrates that the energy consumption of mineralization-based $CO_2$ management is associated primarily with the need to provide alkalinity to the process. An ideal carbon sequestration process would not require consumable chemical inputs, which incur manufacture, transport, handling, and storage costs. Ideally, the process could be powered using zero-carbon electrons, e.g., from photovoltaics. A chemical input-free single-step carbon sequestration and storage ($sCS^2$) process is illustrated in FIGS. 6 and 7. Here, water (e.g., seawater) containing dissolved $CO_2$—in equilibrium with air—flows through a porous metallic membrane/cathode. The application of cathodic potentials leads to water electrolysis and locally elevated $OH^-$ concentrations at the membrane/water interface, which promotes the rapid combination of carbonate anions and metal cations while minimizing transport constraints, and providing a substrate for heterogeneous nucleation. Specifically, flowing electrolyte through the membrane's pores minimizes the diffusive length scale (to the pore radius) for all ionic species ($OH^-$, $CO_3^{2-}$, and $Me^{2+}$) while providing surface sites for the nucleation & growth of metal carbonates. Finite element analysis (FEA) indicates that hyperalkaline conditions can indeed be produced in proximity to the electroactive membrane ("electrode") surface at reasonable overpotentials (≈0.5V; see FIG. 6c). Indeed, the electrolyte volume within 200 μm of the electrode/membrane surface (e.g., far larger than the pore-size of the electroactive membranes envisioned for such applications) experiences hyperalkaline conditions within 1 s of electrical polarization as sufficient to induce carbonate precipitation to the limits shown in FIG. 5. For reference, herein, a 304L stainless steel electrode is represented as a planar sheet; although a coarse-mesh with an opening on the order of about 20 μm is envisioned in practical application. This analysis confirms that the application of mild potentials rapidly generates the needed alkalinity for carbonate precipitation. Although this analysis neglects electromigration and gas evolution which result in convective mixing, it offers a lower bound estimate of the overpotentials that are needed to induce rapid alkalinization, and in turn, carbonate precipitation.

Realistic energy requirements for an electrolytic mineralization process based on electrochemical $OH^-$ generation can be estimated based on current state-of-the-art electrolyzers operating at 79% efficiency (e.g., 50 kWh of electricity to generate 1 kg of $H_2$ assuming a thermodynamic demand of 39.4 kWh/kg for the stoichiometric hydrogen evolution reaction). 1 kg of $H_2$ produced via the electrolysis of water yields 1000 moles of $OH^-$ ions which can sequester, on a stoichiometric basis, 22 kg of $CO_2$, for an energy intensity of 2.3 MWh per tonne $CO_2$. If one considers the calorific value of the co-produced hydrogen, assuming a conversion efficiency (e.g., to combust hydrogen and produce electricity) on the order of 60%, e.g., similar to natural gas combustion, the process yields an energy intensity of 1.2 MWh per tonne of $CO_2$ mineralized. This analysis considers a stoichiometry wherein 2 mol of $OH^-$ mineralize 1 mol of $CO_2$ into calcium carbonate ($CaCO_3$). Following this basis, 45 kg of low-pressure $H_{2(g)}$ would be generated for every tonne of $CO_2$ mineralized. Such hydrogen is expected to offer a commercial value on the order of $3/kg, such that a cost-offset on the order of $135 could be realized per tonne of $CO_2$ mineralized. On the other hand, if the low-pressure hydrogen produced were to be converted into electricity using a hydrogen fuel cell (HFC), a conversion efficiency on the order of 80% could be realized, such that the energy intensity of 0.84 MWh per tonne of $CO_2$ mineralized would result. The energy intensity further decreases to 1.9 MWh per tonne of $CO_2$ (without $H_2$ recovery; $133 per tonne of $CO_2$) and 0.38 MWh per tonne $CO_2$ (with $H_2$ recovery and conversion at 90% efficiency using a HFC; $27 per tonne of $CO_2$) for an electrolyzer operating at 90% efficiency. These values bound the practical energy intensities for $sCS^2$ (see yellow area in FIG. 5). Taken together, this analysis indicates that: (i) direct electrolytic mineralization can achieve carbon removal nearly twice as effectively as typical chloralkali-based NaOH production and amine solvent-based processes at ambient concentrations of $CO_2$ (e.g., conservatively, less than 2.3 MWh per tonne versus greater than 4 MWh per tonne), and (ii) if the energy benefit of the hydrogen co-product is considered and/or zero-carbon energy input is used; in each case the $sCS^2$ approach offers a basis for a pioneering, truly negative emissions technology (NET).

A significant advantage of mineralization using electroactive membranes for the localized generation of alkalinity is that it enhances the kinetics of precipitation (both nucleation and growth) because of the elevated pH, supersaturation ($\Omega$; see FIGS. 4 and 6c) and the temperature rise produced at the membrane surface induced by Joule heating (up to 60° C., in solution). The electrolytic nature of the process requires conductive (e.g., metallic, or composite) membranes that are mechanically and chemically stable under cathodic conditions. Such membrane surfaces are expected to foul during operation due to the formation of metal carbonates. Expectedly, the engineering design of the sCS² process would match Reynolds, Peclet and Damkohler numbers within the electrolytic precipitation reactor; such that (reactant) mass transfer and chemical precipitation kinetics, occur in correspondence with each other. While this is not likely to result in substantive flux decay in coarse-mesh architectures as considered herein, the insulating nature of the mineral carbonates can indeed compromise current density (e.g., thereby increasing the overpotential that's needed) and energy efficiency. Therefore, reversing the applied potential, cyclically, to anodically generate $O_2$ and $H^+$ near the membrane surface is likely needed to remove deposits. However, anodic conditions can lead to rapid corrosion, particularly if iron-based membranes are used. Another method involves the physical abrasion of deposited carbonates, in a manner similar to that used to continuously clean rotary drum filters (e.g., see FIGS. 6b, 7). In these systems, the membrane's surface is continuously scraped with a blade that dislodges accumulated solids and re-exposes the membrane surface. While unquestionably the sCS² concept features a high energy intensity for carbon abatement; it is: (a) more efficient than the vast majority of other direct air capture (DAC) approaches, (b) it allows straightforward use of carbon-free electricity; e.g., especially at times of excess, and (c) it ensures end-to-end $CO_2$ abatement. In addition, rather than demanding the construction of new chloralkali plants, the electrolytic reactors envisaged herein can simply be modularly integrated with existing and future desalination plants, thereby allowing $CO_2$-removal and sequestration while producing potable water, and hydrogen which can be used as a fuel. An added benefit of the sCS² process is the generation of softened water, which is an excellent feed for desalination plants. Currently, the energy cost of desalinating seawater can be estimated as 3.5 kWh per t of water, considering that seawater reverse osmosis (SWRO) requires 2-2.5 kWh per $m^3$, and the pretreatment steps, e.g., substantively including water softening, consume 0.3-1.0 kWh per $m^3$ of seawater. Combining $CO_2$ mineralization-based pretreatment and SWRO desalination can lead to an energy use that is 9% lower than the total energy consumption of these two processes, operating separately.

Significantly however, even if a cation replenishment/pH adjustment is required—it can be readily achieved in an electrochemical system by exploiting the acidity generation that is consequent at the anode. Specifically, in an engineered system, electrolytic (re)alkalinization of the reject seawater stream can be performed by the dissolution of mafic and ultramafic rocks, and industrial solids including coal combustion and metal processing residues, in the style of enhanced weathering, using the acidity co-generated in the sCS² process. Notably, this analysis shows that a unit of alkalinity stores a greater amount of $CO_2$ in an aqueous form than as solid. Whereas 2 moles of $OH^-$ are required for each mole of C stored as a carbonate solid, only 1.2 moles of $OH^-$ are required per mole of C stored as dissolved ions. As a result, increasing the pH from 8 to 9 (e.g., 1 µM $OH^-$ to 10 µM $OH^-$) solubilizes an additional 33 mmol $CO_2$ per kg water (FIG. 3). Thus, the discharge water can be designed to have a greater pH (e.g., higher [Ca] and/or [Mg]) than the extracted seawater; to render a further enhanced carbon abatement benefit. Therefore, strategies for removing atmospheric $CO_2$ should be carefully combined with seawater (re)alkalinization to enhance its $CO_2$ capacity as driven by the ocean-atmosphere equilibrium.

Fate of the carbonate solids. The entrapment of $CO_2$ within mineral carbonates can occur rapidly, and offers stable and durable storage while eliminating any risk of post-sequestration release. Assuming stoichiometry, and the precipitation of calcite, the removal of 10 Gt of $CO_2$ from the atmosphere (that is dissolved in seawater) can result in the production of around 20 Gt of solids annually. Some of these solids could substitute the global limestone market which spans construction materials (aggregates) and specialty applications. In the U.S., 68% of produced crushed stone is composed carbonate rocks; about 1 Gt of production that is used for construction and as raw material for cement production. The solids that cannot be utilized can be disposed of via existing solid waste management strategies. In 2016, global municipal solid waste generation and industrial, agricultural, and construction and demolition waste amounted to about 25 Gt. Landfilling of solid waste costs about $45 per t in the U.S. and landfill disposal of 10 Gt of carbonate solids can require about 6.8 $km^3$ (6.8 billion $m^3$) of space per year. Rather than building new landfills, the solids can be stored at defunct mines. In 2017, 53 Gt of metal and non-metallic ore material, 15 Gt of fossil fuels, and 24 Gt of biomass was extracted worldwide. However, offsite storage would require transportation of the solids, costing about $0.03 per $m^3$ per km. More realistically, particularly if using seawater as the alkaline source, the precipitates could be redeposited in the oceans (e.g., in the style of desalination brines; wherein since the oceans are oversaturated with respect to calcite and magnesite, these solids can remain stable, and unreactive), or used for land reclamation and erosion prevention purposes.

Under the London Protocol as amended and enforced in 2006, marine dumping is prohibited except for possibly acceptable wastes as outlined in the "reverse list" of Annex 1. Calcium and magnesium carbonates may qualify as "inert, geological materials" which are permissible for disposal in the ocean where they can remain stable since near-surface seawater is supersaturated with respect to both phases. If dissolved Ca and Mg are taken from sources other than seawater (e.g., saline groundwater), the precipitated Ca and Mg carbonates can be used to buffer decreasing ocean pH caused by either atmospheric $CO_2$ absorption or direct $CO_2$ injection, by the addition and dissolution of limestone. Coming back to land reclamation, a simple model of shoreline migration in southern California approximates a recession of about 30 m for 1 m of sea level rise. Assuming that the continental shelf has an average depth of 50 m, generation of 20 Gt of solids can reverse this effect over a shore line extending 4500 km; around half the length of Florida's gulf coast. Creation of new land by $CO_2$ mineralization derived solids may not only address future $CO_2$ emissions, but could potentially reverse one of the most prominent effects of climate change. The crisis of disappearing landmass and habitat by sea level rise can be addressed, while providing a $CO_2$ storage solution that is both permanent and does not require continuous monitoring. An in-depth analysis of the mechanisms for subsidizing $CO_2$ management via the sCS² approach, particularly the associated capital cost, is beyond the scope of this work. Nonetheless, the recent 45Q tax-credit in the U.S. and California's low-carbon fuel standard (LCFS), incentivize carbon mitigation by implicitly pricing $CO_2$ between $35-$180 per t. Such incentives offer important and potentially prerequisite pathways for enabling and empowering global-scale $CO_2$ mitigation and reduction.

This sCS² pathway to the $CO_2$ problem is distinct from traditional carbon capture and geological sequestration strategies. Unlike conventional sorbent-based $CO_2$ capture processes wherein substantial energy expenditures are associated with those required for: (1) demixing $CO_2$, often at dilute concentrations (less than 15 vol %) from a gaseous mixture, and (2) for CO$_2$ desorption, the sCS$^2$ approach relies on electrolytically promoted carbonate mineral precipitation within a process that can be operated fully using renewable energy. However, a major gap in the supply of carbon-free electricity needs to be closed for this to achieve practical viability. In the end, by stabilizing solid carbonates, this approach eliminates the need for monitoring and verification of CO$_2$ sequestration and storage, while the permanence of CO$_2$ storage is enhanced and assured. Given that carbon storage needs to last for thousands of years, the combination of electrolytic seawater CO$_2$ mineralization only when combined with accelerated silicate/carbonate weathering may offer us a viable, environmentally-benign, and potentially more acceptable approach toward solving the global carbon crisis than traditional geological sequestration; especially as NETs are deployed in the short-to-medium term (in 5-to-10 years).

The sCS$^2$ approach, in some embodiments, includes electroactive mesh compositions, and their integration into "rackable and stackable" flow-reactors to achieve scalable CO$_2$ mitigation without a need for any stoichiometric reagents, or additives (see FIG. 7), in a strategy that is specifically tailored for direct air capture (DAC). Herein, water containing dissolved alkaline cations, and dissolved CO$_2$ (e.g., produced water, ground water, or seawater)—in equilibrium with air—flows through a porous conducting mesh/cathode. The application of cathodic potentials leads to water's electrolysis and locally elevated OH$^-$ concentrations at the mesh/water interface, which promotes the rapid combination of carbonate anions and metal cations (e.g., Ca$^{2+}$, Mg$^{2+}$) by minimizing transport constraints, and providing a substrate for heterogeneous nucleation (FIG. 7). Two rationales underlie this hypothesis: (1) The electrochemical generation of OH$^-$ on a cathode surface, and the N&G of metal carbonates are rapid reactions. Thus, the rate of crystal growth is limited by the transport of the ions towards the growing nuclei. Electrochemically generating OH$^-$ along a porous mesh/electrode, while simultaneously flowing electrolyte through the mesh's pores minimizes the diffusive length scale (to the pore radius) for all ionic species (OH$^{9-}$, CO$_3^{2-}$, Ca$^{2+}$, and Mg$^{2+}$) while providing surface sites for the N&G of metal carbonates thereby enhancing reaction rates. (2) Heterogeneous nucleation is favored vis-à-vis homogeneous nucleation, due to the lower energetic barrier for crystal growth (e.g., 5 kJ/mol vs. 12.5 kJ/mol for CaCO$_3$). Therefore, providing a surface (e.g., mesh/electrode), where the pH is highest, promotes the precipitation of carbonates while sequestering atmosphere-derived CO$_2$.

In support of this approach, experimental data and finite element analysis (FEA) indicate that hyperalkaline conditions (pH>10) are readily produced in proximity (e.g., within 200 μm) of the electroactive mesh/cathode surface at reasonable overpotentials (≈0.5V). While the formation of carbonates on mesh surfaces can limit electron transfer reactions, the sCS$^2$ process can include physical methods e.g., (scraping and/or water scouring) to dislodge the precipitates and refresh the mesh/cathode surface, in a manner similar to what is used in commercial rotating drum filters. The precipitates can be collected and/or discarded as suspended solids in a manner similar to desalination brines (FIG. 7). Electrolytic (re)alkalinization of the reject seawater stream through the dissolution of alkaline rocks and industrial solids (coal combustion residues), can allow for even more absorption of CO$_2$ from the atmosphere in the style of enhanced weathering. Furthermore, the electroactive mesh architectures that can be developed herein feature superior performance (e.g., on the basis of energy per unit CO$_2$ captured, mineralized or abated) as compared to existing sorbents and membranes for DAC.

This approach leverages the much higher concentration of CO$_2$ in water vis-à-vis air as conditioned by atmosphere—seawater equilibration. Seawater, at its current average pH of 8.1, contains 150 times more CO$_2$ than an equivalent volume of air (FIG. 3), thus significantly reducing the volume of fluid to be processed. Although the relative densities of seawater and air are larger than this concentration factor, pumping water is more efficient than air, and requires a smaller quantity of water to be handled, than air, to remove the same quantity of CO$_2$. In addition, the sCS$^2$ approach exploits the favorable thermodynamics of carbonate precipitation from alkaline solutions. The thermodynamic driving force for precipitation is given by the saturation state, $\Omega$=IAP/K$_{sp}$, where IAP is the ion activity product and K$_{sp}$ is the solubility product. For calcite this is the product of the activities of Ca$^{2+}$ and CO$_3^{2-}$ in solution and at equilibrium. The Gibbs free energy difference is a function of the solution composition according to: $\Delta G$=RT ln $\Omega$, where R is the gas constant and T is the temperature. A comparison of the standard Gibbs free energies of formation, $\Delta G_f^0$, of CO$_2$ (g) (−394.3 kJ/mol), CO$_3^{2-}$ (−527.8 kJ/mol), and CaCO$_3$ calcite (−1129.1 kJ/mol), shows that carbonate precipitation ("CO$_2$ mineralization") is thermodynamically downhill. Electrochemical alkalization raises the solution's pH and $\Omega_{calcite}$, thereby ensuring calcite (and/or magnesite or other carbonate) precipitation (FIGS. 4 and 6). The reactions associated with carbonate precipitation in alkaline solutions are rapid. Under well-mixed conditions at 25° C. and 1 atm (1 bar), the equilibrium described by CO$_2$ (g) ⇌ CO$_2$ (aq) occurs within t=5.0×10$^{11}$ s. The aqueous species H$_2$CO$_3$, HCO$_3^-$, and CO$_3^{2-}$, as described by: CO$_2$ (aq)+H$_2$O ⇌ H$_2$CO$_3$, H$_2$CO$_3$ ⇌ H$^+$+HCO$_3^-$ and HCO$_3^-$ ⇌ H$^+$+CO$_3^{2-}$ reach equilibrium within 10$^{-2}$ s. In alkaline solutions (pH>10), the alternative pathway of CO$_2$ solvation by reaction with OH$^-$ to form HCO$_3^-$ is even faster (k=8.5×10$^3$ M$^-$s$^{-1}$) than that with H$_2$O (k=6.6×10$^4$ M$^{-1}$ s$^{-1}$). The data of calcite precipitation rates in highly saline water (≥0.5 M NaCl) indicates a precipitation rate constant of 3.2×10$^6$M s$^{-1}$ with a yield that is consistent with FIG. 4, derived by fitting experimental precipitation data to: R$_p$=k($\Omega$-1)$^n$, where R$_p$ is the precipitation rate, k is rate constant, $\Omega$ is saturation index, and n is reaction order. Thus, in a well-mixed system with low mass transport resistances, CaCO$_3$ precipitation is rate limiting. The net reactions are: Ca$^{2+}$+CO$_2$+2OH$^+$→CaCO$_3$+H$_2$O and Mg$^{2+}$+CO$_2$+2OH$^+$→MgCO$_{3+}$+H$_2$O. Following these stoichiometries, 1 mol of CO$_2$ is captured by 1 mol of aqueous Ca$^{2+}$ or Mg$^{2+}$ and 2 mol of OH$^-$ are needed to produce 1 mol CaCO$_0$ or MgCO$_3$. For typical seawater, in a cation-limited circumstance—the boundary condition of relevance—2.86 g of CO$_2$ is mineralized per 1000 g of water (FIG. 4) processed.

The pH distribution in a scaled-reactor was simulated for clarity. The simulation takes account of the electrode reactions as follows: (1) at the anode: oxygen evolution reaction (OER): 2H$_2$O→O$_2$+4H$^+$+4e$^-$; (2) at the cathode, (2a) oxygen reduction reaction (ORR): O$_2$+H$_2$O+4e$^+$→4OH$^-$, and the (2b) hydrogen evolution reaction (HER): 2H$_2$O+2e-→H$_2$+2OH$^-$.

The electrochemical behavior of 304L stainless steel is shown in FIG. 8(a). Dissolved oxygen in solution promotes the ORR at negative overpotentials (vs. HER), and a diffusion limiting current of 4×10$^{-7}$ A/cm$^2$ is attained at overpotentials of 0 to 0.4 V. Such a limiting current can be overcome by the HER (e.g., water breakdown), whose current follows a Tafel relationship with the applied overpotential. The ORR can produce the localized alkalinity at the cathode up to pH 10, whereas the HER promotes yet higher pH generation; although at a higher cell potential.

The sCS$^2$ process consists of one principal unit operation as shown in FIG. 9. Herein, Ca— and Mg-rich waters (e.g., seawater, produced water, ground water) that are saturated with $CO_2$ from air at atmospheric conditions (~23° C., 1 bar total pressure, and ~400 ppm $CO_2$) are brought into the electrolytic flow reactor.

Two configurations are disclosed as non-limiting examples, using either: (A) planar electrodes (FIG. 9(a)) or (b) tubular electrodes (FIG. 9(b)). In (a), a mesh cathode is placed in the center of a rectangular shell composed of a non-conducting material, thereby creating two chambers (FIG. 9(a)). The anode is inserted near the wall of one of the chambers. In (B), the anode and the cathode are placed radially within a non-conducting tube, similar to the configuration shown in FIG. 4 (FIG. 9(b)). Seawater (105 mg of $CO_2$ equivalent C per L, see FIG. 3) flows through the precipitation reactors consisting of the mesh/cathode-anode systems described below. The evolution of $Cl_{2(g)}$ at the anode caused by electrolysis of seawater can be inhibited using an oxygen-selective materials (e.g., $MnO_2$), which have 95-100% efficiency of OER, as coatings on the anode allowing the use of a single electrolyte (seawater). Within the reactor, the application of cathodic potentials elevates [OH$^-$] at the cathode/water interface, leading to precipitation. This is shown in simulations of the pH distribution thermodynamically favored mineralization reactions. Because membrane fouling does not compromise the sCS$^2$ process, and is in fact the objective of it, it allows simple mechanical removal of solids and/or cyclic polarity reversal as a means for membrane regeneration.

The sCS$^2$ process is far more energy efficient than existing direct air capture (DAC) methods. First the energy intensity of traditional carbon capture and storage (CCS) is estimated by considering a monoethanolamine (MEA)-based process consisting of an absorber, stripper, cooler, and four-stage compressor using Aspen Plus®. At inlet $CO_2$ concentrations <3 vol. % $CO_2$, the energy requirements escalate sharply extrapolating to >3 MWh/t $CO_2$ at 0.04% primarily because of the increase in the heat energy required to desorb $CO_2$ from the solvent at low loadings. The energy requirements for sCS$^2$ are primarily associated with water electrolysis. State-of-the-art electrolyzers operating at 79% efficiency (e.g., 50 kWh of electricity to generate 1 kg of $H_2$ assuming a thermodynamic demand of 39.4 kWh/kg for the HER) produce 1000 moles of OH$^-$ ions which can mineralize, on a stoichiometric basis, 22 kg of $CO_2$, for an energy intensity of 2.3 MWh per ton $CO_2$. The energy intensity decreases to 1.9 MWh per ton of $CO_2$ for an electrolyzer operating at 90% efficiency. Thus, the anticipated power requirement for the process in FIG. 4 (2 kg $CO_2$ per day) is ~0.2 kW (~4.6 kWh per day). Energy is also needed for pumping water: (i) across the mesh 0 psi for a 40 μm mesh opening; 1.2 kWh per t $CO_2$) and (ii) against gravity (e.g., 1 meter of total dynamic head; 1.3 kWh per t $CO_2$).

TABLE 1

State-Point Data for an Electroactive Mesh Based $CO_2$ Removal System

|  | Units | Measured/Estimated Performance | Projected Performance |
| --- | --- | --- | --- |
| Materials Properties |  |  |  |
| Materials of Fabrication for Mesh Architectures |  | Stainless Steel, $Ti_4O_7$, Carbon Nanotubes/Exfoliated Graphite with pores ranging from 0.1 μm-to-100 μm | |
| Nominal Thickness of Mesh (μm) |  | <2500 | <2500 |
| Mesh Geometry |  | Flat Planes | Flat Planes, Cylinders |
| Hours tested without significant degradation |  | 42$^{33}$ | Continuous |
| Mesh Performance |  |  |  |
| Temperature | ° C. | Ambient (~23° C.) | Ambient (~23° C.) |
| Flux of seawater | L h$^{-1}$ m$^{-2}$ | 100 | 7000 |
| Energy Intensity | MWh (ton $CO_2$ captured)$^{-1}$ | 2.3 | 0.84 |
| Single Pass Solid Carbonate Yield | kg total carbonate per m$^3$ water | 3.4 | 5.6 |
| Single Pass $CO_2$ Removal Yield | kg $CO_2$ per m$^3$ water | 1.7 | 2.9 |
| Proposed Module Design |  |  |  |
| Flow Arrangement | — | Perpendicular to the electroactive mesh (FIG. 10) | | within a pore of an electroactive mesh (FIG. 10). Near-neutral seawater enters the pore and becomes increasingly more alkaline up to pH 12 (FIG. 10(a)), to an extent that depends on the current density (FIG. 10(b)) and flow rate (FIG. 10(c)).

Electroactive mesh compositions and flow reactors to enable seawater-mediated DAC, utilizing both the technology advantages of a membrane-based water processing system and the substantially higher amounts of $CO_2$ in seawater than in air at ambient conditions, while exploiting The process disclosed in some embodiments herein is functionally analogous to membrane-based DAC approaches. However, the removal is based on an electrically-induced chemical reaction rather than size or charge exclusion. Metrics such as (1) processing capacity, (2) energy intensity, and (3) single pass yield of carbonate can provide the relevant information as analogous to those sought for traditional membrane-based processes. The data indicate that electrolytic precipitation reaction is rapid; k≈3.2×10$^6$M s$^{-1}$. Thus, the yield is limited by the amounts of cations present. For a Ca—, Mg-limited reaction, 60% and 100% conversion results in the "Measured" and "Projected" metrics.

In some embodiments, the low-pressure hydrogen produced is converted into electricity using a hydrogen fuel cell (HFC), a conversion efficiency on the order of 80% can be realized, such that a net energy intensity of 0.84 MWh pert of $CO_2$ mineralized would result.

The feasibility of (a) electroactive mesh materials, and (b) flow reactors into which the meshes are integrated, to allow alkalization of water and to promote ultrafast precipitation has been demonstrated for the treatment of chromium-containing water, where a pH swing along the mesh surface/cathode enabled the rapid accumulation of $Cr(OH)_3$ at the membrane/water interface (FIG. 11). Meshes include: (a) a baseline mesh based on a 316L stainless steel (SS) mesh or perforated sheet, (b) a non-metallic carbon-based mesh (a carbon nanotube (CNT)/polymer/exfoliated graphite composite), and (c) a SS mesh with a topical sintered-titanium film (Magneli-phase sintered $Ti_4O_7$ materials). The latter two mesh compositions are chosen to offer: high conductivity, and stability in seawater, particularly under anodic conditions (that may be periodically needed to clean the mesh) that can corrode Fe-based materials. The materials chosen feature: low cost, easy processability, which enables the easy fabrication of many form factors, including porous (e.g., coarse mesh with an opening ranging from µm to mm) structures. For example, porous $Ti_4O_7$ materials are readily manufactured through sintering and thermal reduction of $TiO_2$ powders. It is also possible to: (i) apply doctor-blade processing to rapidly produce carbon-electrode mesh materials that span 100 s of $in^2$, and (ii) fabricate large-scale CNT-based membranes by air-brushing a percolating network of CNTs onto a porous polymeric support and then cross-linking with polymers, e.g., polyvinyl alcohol (PVA) (see FIG. 11). These composites are stable and electrically conducting, with variable pores sizes from nm to mm.

A range of metallic and carbon-based mesh/electrodes suitable for inducing pH swings in saline solutions can be used. Specifically, the use of porous geometries (e.g., meshes, or non-woven mats) composed of: stainless steel (SS) (~\$12 per $m^2$ for a sintered mesh or ~\$0.05 per g), Magneli-phase sintered $Ti_4O_7$ materials (synthesized from $TiO_2$, ~\$0.10-0.20 US cents per g), and a carbon nanotube (CNT)/polymer/exfoliated graphite (eG) composite (e.g., CNTs costs ~\$3-\$30 per g, and eG synthesized from graphite, ~\$0.10 per g). Mesh materials (<5 cm×5 cm) with various porosities (15-40%) and pore sizes (0.1 µm-100 µm, corresponding to pressure drops <15 psi) can be used (smaller pores allow a higher pH at a lower overpotential, but require a larger driving force to push water through). For SS, commercially available mesh materials can be used (e.g., made from 304 and 316L SS) and sintered metal sheets with pore sizes between 37 µm (400 mesh) and 1 µm (for sintered SS plates). To make $Ti_4O_7$ coated-meshes, $TiO_2$ powders can be purchased, cast in a gel and sintered under flowing air at 1050° C., and then reduced under flowing $H_2$ gas at 1050° C.; conditions that produce sub-stoichiometric $Ti_4O_7$. An alternative approach for synthesis is via a combination of sol-gel and vacuum-carbothermic processes. Carbon-based meshes can be fabricated by spray-coating CNT/eG suspensions onto porous polytetrafluoroethylene, and stainless steel supports, and crosslinked using PVA. Mesh surface morphology and pore sizes can be evaluated using scanning electron microscopy (SEM); mesh roughness, using atomic force microscopy (AFM); and pore sizes, using SEM. The composition of the mesh can be determined using energy-dispersive X-ray spectroscopy (EDS), Fourier-transform infrared spectroscopy (FTIR) and quantitative X-ray diffraction using Rietveld analysis. The bulk electrochemical properties can be characterized using a four-point conductivity probe, cyclic voltammetry, electrochemical impedance spectroscopy, and electrochemical microscopy. The long-term stability of the meshes can be assessed for >168 hours of continuous operation at a current density of 1-to-200 mA/$cm^2$ in a dead-end filtration cell, with the feed stream (seawater) pressurized to flow through the mesh, which can be used as cathodes. A $MnO_2$-coated Ti rod can serve as the anode.

In situ atomic force microscopy (AFM) can be performed for different mesh materials to optimize current density and (water) flux for precipitation of carbonates via seawater electrolysis. This can identify the best performing mesh composition that aligns the alkalization kinetics with the thermodynamic predictions; while maximizing solid precipitate formation. An electrochemical AFM fitted with a fluid cell and temperature control, a potentiostat, and photothermal probe excitation module allowing for high-speed imaging can be used in the screening analysis.

The current density at the mesh surface and the topography of the carbonate overgrowth layers can be monitored while various overpotentials (0.0 V to 2.0 V) are applied on a 1 cm×1 cm×≤0.25 cm mesh samples mounted in a fluid cell containing simulated seawater. The fluid cell features separate liquid and gaseous exchange ports. The aqueous environment in which the mesh is exposed can be controlled in real-time (e.g., during the application of potential and data collection) by exchanging the solution or gases within the fluid cell using a programmable syringe pump. For example, to replenish dissolved $Ca^{2+}$ and $Mg^{2+}$ (e.g., which is extracted from solution by $CaCO_3$ precipitation), simulated seawater is exchanged through the sealed cell at flow rates matching the rate of its depletion from solution. On the other hand, to replenish dissolved atmospheric $CO_2$ without replenishing the cations, air can be flowed through the cell. The kinetics (e.g., rate, morphology) of carbonate growth can be evaluated by collecting time-series images over a period of seconds to hours. The morphology of the precipitates can be tracked by measuring aspect ratio, thickness, and surface coverage, which could affect the progress of electrolytic precipitation by inducing resistive losses/Joule heating at the mesh surface. The change in the precipitate growth rate—for a fixed solution composition, and $pCO_2$— over time can also be evaluated. The solution $\Omega$ can be estimated from modeling the pH evolution at the surface and the gas/liquid exchange rates. Thus, the electrolytic conditions (e.g., applied potential, flow rates, $\Omega$) that maximize growth rate can be identified. The mesh which enables the highest yield and rate of carbonate precipitation at the lowest overpotential, and carbonate growth rate decrease, over time, e.g., because of resistive losses, can be selected. The cycling performance of the selected mesh can be tested over 10 s of polarization reversals while surface topography/current density are monitored.

Definitions

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Additional Embodiments

E1. A method comprising:
introducing carbon dioxide into a solution; and
inducing precipitation of a carbonate solid from the solution, wherein inducing precipitation of the carbonate solid includes performing water electrolysis on the solution.

E2. The method of E1, wherein introducing carbon dioxide into the solution is via a gas diffuser or the solution may contain carbon dioxide at a level in equilibrium with its environment.

E3. The method of any of E1-2, wherein performing water electrolysis on the solution includes increasing a pH of the feed solution.

E4. The method of any of E1-3, wherein performing water electrolysis on the solution includes generating hydroxide ions.

E5. The method of any of E1-4, wherein inducing precipitation of the carbonate solid includes rotating a membrane drum in the solution, while applying suction to draw the solution onto a surface of the membrane drum.

The method of any of E1-5, wherein the solution is a brine solution.

E7. The method of any of E1-6, wherein the solution is an alkaline metal-containing solution.

E8. The method of any of E1-7, wherein inducing precipitation of the carbonate solid includes inducing precipitation of at least one of calcium carbonate or magnesium carbonate.

E9. A method comprising:
introducing carbon dioxide into a solution; and
inducing precipitation of a carbonate solid from the solution, wherein inducing precipitation of the carbonate solid includes rotating a membrane drum in the solution, while applying suction to draw the solution onto a surface of the membrane drum.

E10. The method of E9, wherein introducing carbon dioxide into the solution is via a gas diffuser.

E11. The method of any of E9-10, wherein inducing precipitation of the carbonate solid includes performing water electrolysis on the solution.

E12. The method of any of E9-11, wherein the solution is a brine solution.

E13. The method of any of E9-12, wherein the solution is an alkaline metal-containing solution.

E14. The method of any of E9-13, wherein inducing precipitation of the carbonate solid includes inducing precipitation of at least one of calcium carbonate or magnesium carbonate.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it can be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A method of removing carbon dioxide from a gaseous fluid by:
contacting the gaseous fluid, with an aqueous solution comprising cations capable of forming insoluble carbonate and/or hydroxide salts; and
contacting the aqueous solution with an electroactive mesh that induces alkalinization, thereby inducing the precipitation of carbonate and/or hydroxide solid(s) from the solution.

2. The method of claim 1, wherein the gaseous fluid comprises between 0.04 to 100 vol. % $CO_2$.

3. The method of any claim 1, wherein the gaseous fluid is atmospheric air.

4. The method of claim 1, wherein the gaseous fluid is flue gas emitted from: a natural gas-fired power plant, a coal-fired power plant, an iron mill, a steel mill, a cement plant, an ethanol plant, a chemical manufacturing plant, or other industrial operations.

5. The method of claim 1, wherein the aqueous solution contains an amount of dissolved carbon dioxide that is in equilibrium with the gaseous fluid.

6. The method of claim 1, wherein the aqueous solution is in thermal equilibrium with gaseous fluid.

7. The method of claim 1, wherein the aqueous solution is not in thermal equilibrium with the gaseous fluid.

8. The method of claim 1, wherein the cations capable of forming the insoluble carbonate and/or hydroxide salts comprise cations of one or more of: Ca, Mg, Ba, Sr, Fe, Zn, Pb, Cd, Mn, Ni, Co, Cu, and Al.

9. The method of claim 1, wherein the aqueous solution has a concentration of NaCl of about 1,000 ppm or more.

10. The method of claim 1, wherein the aqueous solution comprises seawater.

11. The method of claim 1, wherein the method utilizes an end-to-end energy intensity of about 5 MWh or less per tonne of carbon dioxide mineralized.

12. The method of claim 1, wherein the aqueous solution contains an amount of dissolved carbon dioxide that is buffered to atmospheric abundance.

13. The method of claim 1, wherein the electroactive mesh produces an increased alkaline condition, in situ, in the aqueous solution within about 2 to 20000 μm of the electroactive mesh.

14. The method of claim 13, wherein the alkaline condition is a pH of 8 or greater.

15. The method of claim 1, wherein the electroactive mesh comprises a metallic, non-metallic, or carbon-based mesh.

16. The method of claim 15, wherein the electroactive mesh contains stainless steel, titanium oxide, carbon nanotubes, polymers, graphite, or any combination thereof.

17. The method of claim 1, wherein the electroactive mesh comprises pores having a diameter in the range of about 0.1 μm to about 10000 μm.

18. The method of claim 1, wherein inducing the precipitation of the carbonate and/or hydroxide solids includes rotating a cylinder comprising the electroactive mesh in the solution, while applying suction to draw the solution onto the outer surface of the mesh.

19. The method of claim 1, wherein the aqueous solution is a brine solution.

20. The method of claim 1, wherein the aqueous solution is an alkaline earth-metal-containing solution.

21. The method of claim 1, wherein inducing precipitation of the carbonate and/or hydroxide solids includes inducing precipitation of at least one carbonate or hydroxide of Ca, Mg, Ba, Sr, Fe, Zn, Pb, Cd, Mn, Ni, Co, Cu, or Al.

22. The method of claim 1, wherein the aqueous solution contains an amount of dissolved carbon dioxide that is not in equilibrium with the gaseous fluid.

23. A flow-through electrolytic reactor comprising an intake device in fluid connection with a rotating cylinder, comprising an electroactive mesh, and a scraping device and/or liquid-spray based device for separating a precipitated solid from a surface or solution.

24. The flow-through electrolytic reactor of claim 23, further comprising an aqueous solution comprising carbon dioxide, $Ca^{2+}$ ions, and $Mg^{2+}$ ions.

25. The flow-through electrolytic reactor of claim 23, wherein the electroactive mesh contains a metallic, non-metallic, or carbon-based mesh.

26. The flow-through electrolytic reactor of claim 25, wherein the electroactive mesh contains stainless steel, titanium oxide, carbon nanotubes, polymers, graphite, or any combination thereof.

27. The flow-through electrolytic reactor of claim 23, wherein the reactor comprises a plurality of electroactive meshes.

28. The flow-through electrolytic reactor of claim 27, wherein the plurality of electroactive meshes are arranged in a series of planar cells in parallel or a series of cylindrical cells in parallel.

29. The flow-through electrolytic reactor of claim 23, wherein the reactor is in fluid communication with a desalination device.

* * * * *